United States Patent
Terada et al.

(10) Patent No.: US 9,826,246 B2
(45) Date of Patent: *Nov. 21, 2017

(54) IMAGE CODING METHOD INCLUDING SELECTING A CONTEXT FOR PERFORMING ARITHMETIC CODING ON A PARAMETER INDICATING A CODING-TARGET COEFFICIENT INCLUDED IN A SUB-BLOCK

(71) Applicant: SUN PATENT TRUST, New York, NY (US)

(72) Inventors: Kengo Terada, Osaka (JP); Takahiro Nishi, Nara (JP); Youji Shibahara, Tokyo (JP); Kyoko Tanikawa, Osaka (JP); Hisao Sasai, Osaka (JP); Toshiyasu Sugio, Osaka (JP); Toru Matsunobu, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/050,837

(22) Filed: Feb. 23, 2016

(65) Prior Publication Data

US 2016/0173911 A1 Jun. 16, 2016

Related U.S. Application Data

(63) Continuation of application No. 13/721,328, filed on Dec. 20, 2012, now Pat. No. 9,332,253.

(Continued)

(51) Int. Cl.
*H04N 19/44* (2014.01)
*H04N 19/13* (2014.01)
(Continued)

(52) U.S. Cl.
CPC ............ *H04N 19/44* (2014.11); *H04N 19/13* (2014.11); *H04N 19/167* (2014.11);
(Continued)

(58) Field of Classification Search
CPC ...... H04N 19/44; H04N 19/13; H04N 19/167; H04N 19/176; H04N 19/18; H04N 19/60;
(Continued)

(56) References Cited

U.S. PATENT DOCUMENTS

| | | | |
|---|---|---|---|
| 8,675,736 | B2 | 3/2014 | Huang et al. |
| 2010/0290530 | A1 | 11/2010 | Huang et al. |
| 2014/0307801 | A1 | 10/2014 | Ikai et al. |

FOREIGN PATENT DOCUMENTS

| | | |
|---|---|---|
| TW | 201127067 | 8/2011 |
| TW | 201143459 | 12/2011 |
| WO | 2013/065702 | 5/2013 |

OTHER PUBLICATIONS

Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d0, 6th Meeting: Torino, IT, Jul. 14-22, 2011, http://phenix.it-sudparis.eu/jct/doc_end_user/documents/6_Torino/wg11/JCTVC-F803-v2.zip.

(Continued)

*Primary Examiner* — Thai Tran
*Assistant Examiner* — Christopher T Braniff
(74) *Attorney, Agent, or Firm* — Wenderoth, Lind & Ponack, L.L.P.

(57) ABSTRACT

An image coding method for coding an image on a block-by-block basis, includes: selecting, for each of a plurality of sub-blocks included in a coding-target block and each including a plurality of coefficients, a context for performing arithmetic coding on a parameter indicating a coding-target (Continued)

coefficient included in the sub-block from a context set corresponding to the sub-block, based on at least one reference coefficient located around the coding-target coefficient, the coding-target block being a transform unit; and performing arithmetic coding on the parameter indicating the coding-target coefficient using probability information about the selected context, wherein, in the selecting, the context is selected from the context set, the context set corresponding to a sum of (i) a value indicating a position in a horizontal direction of the sub-block in the coding-target block and (ii) a value indicating a position in a vertical direction of the sub-block in the coding-target block.

9 Claims, 42 Drawing Sheets

Related U.S. Application Data

(60) Provisional application No. 61/578,448, filed on Dec. 21, 2011.

(51) Int. Cl.
*H04N 19/167* (2014.01)
*H04N 19/176* (2014.01)
*H04N 19/18* (2014.01)
*H04N 19/60* (2014.01)
*H04N 19/70* (2014.01)
*H04N 19/90* (2014.01)
*H04N 19/91* (2014.01)
*H04N 19/61* (2014.01)

(52) U.S. Cl.
CPC ........... *H04N 19/176* (2014.11); *H04N 19/18* (2014.11); *H04N 19/60* (2014.11); *H04N 19/70* (2014.11); *H04N 19/90* (2014.11); *H04N 19/91* (2014.11); *H04N 19/61* (2014.11)

(58) Field of Classification Search
CPC ........ H04N 19/70; H04N 19/90; H04N 19/91; H04N 19/61
See application file for complete search history.

(56) References Cited

OTHER PUBLICATIONS

Benjamin Bross et al., "WD5: Working Draft 5 of High-Efficiency Video Coding", Joint Collaborative Team on Video Coding (JCT-VC) of ITU-T SG16 WP3 and ISO/IEC JTC1/SC29/WG11, JCTVC-G1103_d0, Ver.1, 7th Meeting: Geneva, CH, Nov. 21-30, 2011.
International Search Report dated Apr. 2, 2013 in corresponding International Application No. PCT/JP2012/008131.
Shih-Ta Hsiang et al., "Non-CE11: Context reduction for coding transform coefficients", Joint Collaborative Team on Video Coding (JCT-VC) of ITU-T SG16 WP3 and ISO/IEC JTC1/SC29/WG11 $7^{th}$ Meeting: Geneva, CH, Nov. 21-30, 2011, [JCTVC-G448].
Joel Sole et al., "Non-CE11: Diagonal sub-block scan for He residual coding", Joint Collaborative Team on Video Coding (JCT-VC) of ITU-T SG16 WP3 and ISO/IEC JTC1/SC29/WG11 $7^{th}$ Meeting: Geneva, CH, Nov. 21-30, 2011, [JCTVC-G323].
Tzu-Der Chuang et al., "Non-CE11: Block-based significance map context selection", Joint Collaborative Team on Video Coding (JCT-VC) of ITU-T SG16 WP3 and ISO/IEC JTC1/SC29/WG11 $8^{th}$ Meeting: San José, CA, USA, Feb. 1-10, 2012, [JCTVC-H0285].
Extended European Search Report dated May 28, 2015 in corresponding European patent application No. 12860389.1.
Thomas Wiegand et al: "WD3: Working Draft 3 of High-Efficiency Video Coding -_D7", Joint Collaborative Team on Video Coding (JCT-VC) of ITU-T SG16 WP3 and ISO/IEC JTC1/SC29/WG11, 5th Meeting, vol. JCTVC-E603_d7, Jun. 15, 2011 (Jun. 15, 2011), XP055146641.
Sole J et al: "Non-CE11: Diagonal sub-block scan for HE residual coding", 98. MPEG Meeting; Nov. 28, 2011-Dec. 2, 2011; Geneva; (Motion Picture Expert Group or ISO/IEC JTC1/SC29/WG11), vol. 5, 14, No. m21885, Nov. 26, 2011 (Nov. 26, 2011), XP030050448.
Wiegand, "WD3: Working Draft 3 of High-Efficiency Video Coding", Joint Collaborative Team on Video Coding (JCT-VC) of ITU-T SG16 WP3 and ISO/IEC JTC1/SC29/WG11, Geneva, Mar. 2011, Document JCTVC-E603.
Office Action dated Mar. 22, 2016 in Taiwanese Patent Application No. 101148659, with English language Search Report.

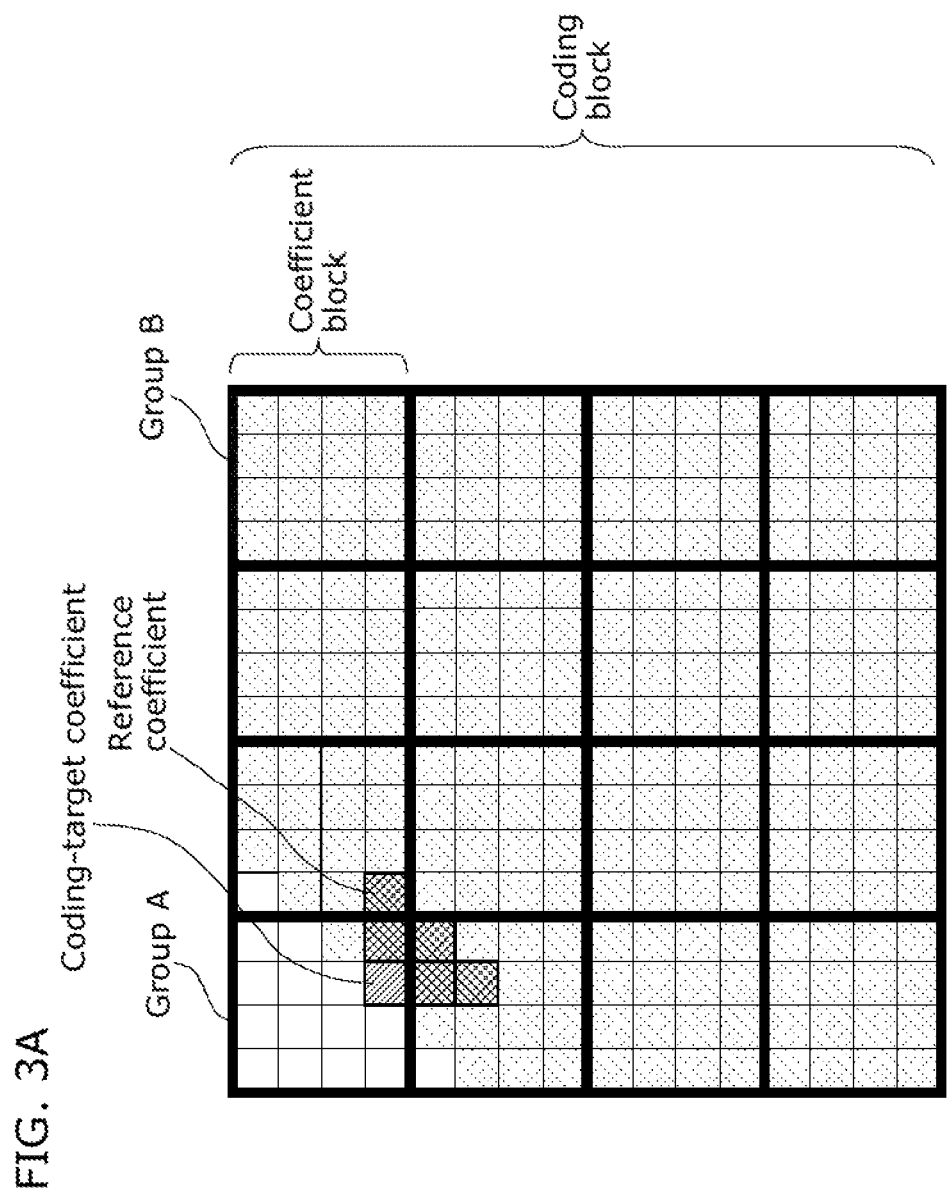

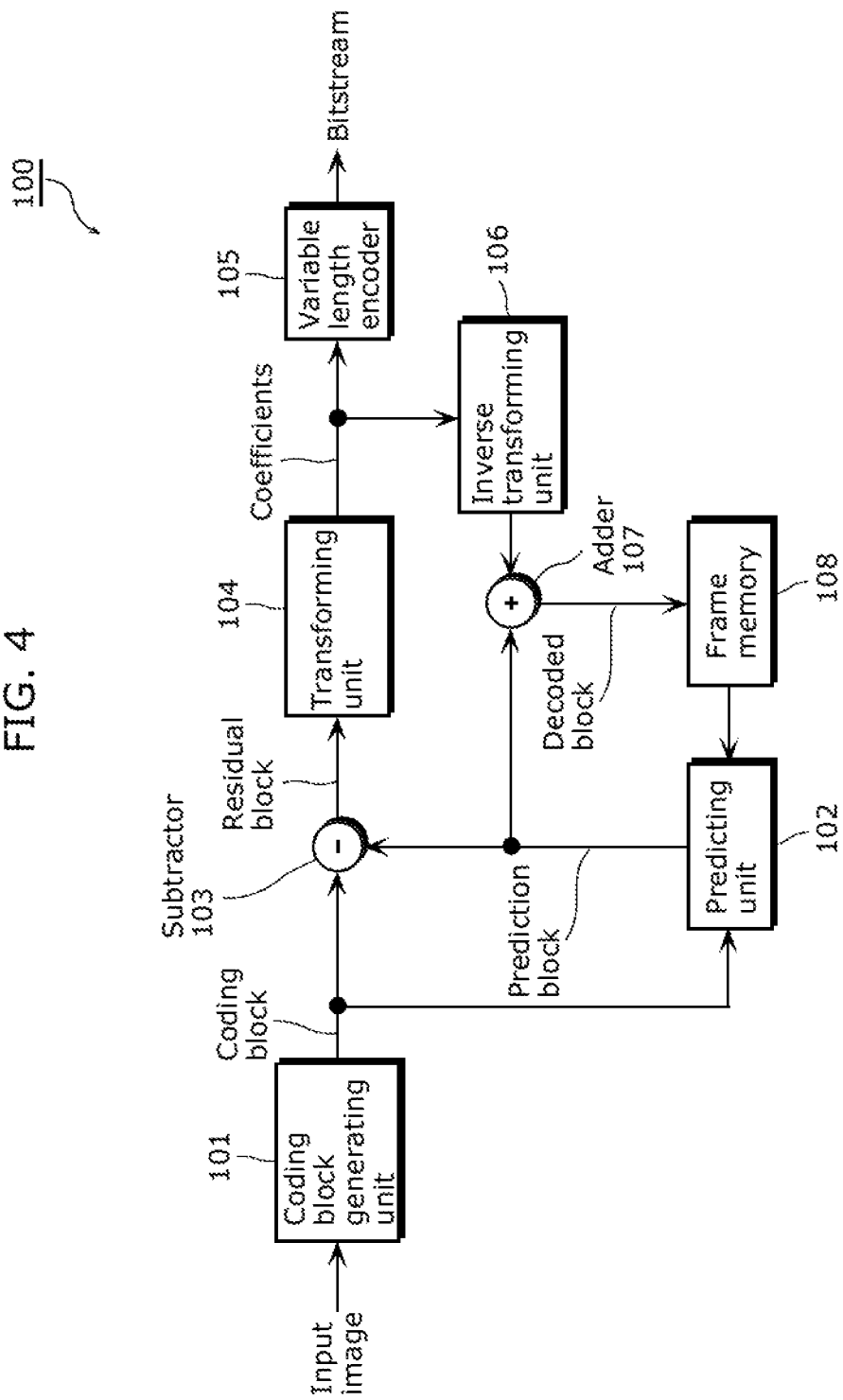

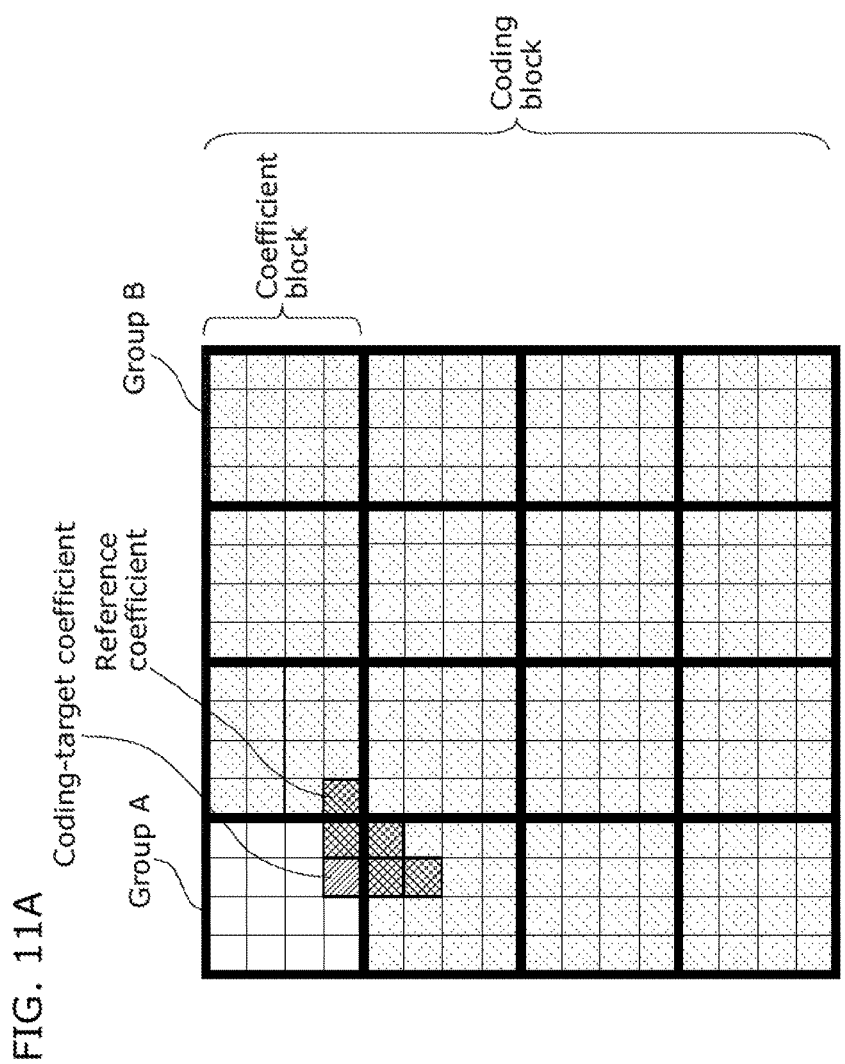

FIG. 28

| Video stream (PID=0x1011, Primary video) | Audio stream (PID=0x1100) | Audio stream (PID=0x1101) | Presentation graphics stream (PID=0x1200) | Presentation graphics stream (PID=0x1201) | Interactive graphics stream (PID=0x1400) | Video stream (PID=0x1B00, Secondary video) | Video stream (PID=0x1B01, Secondary video) |

FIG. 31
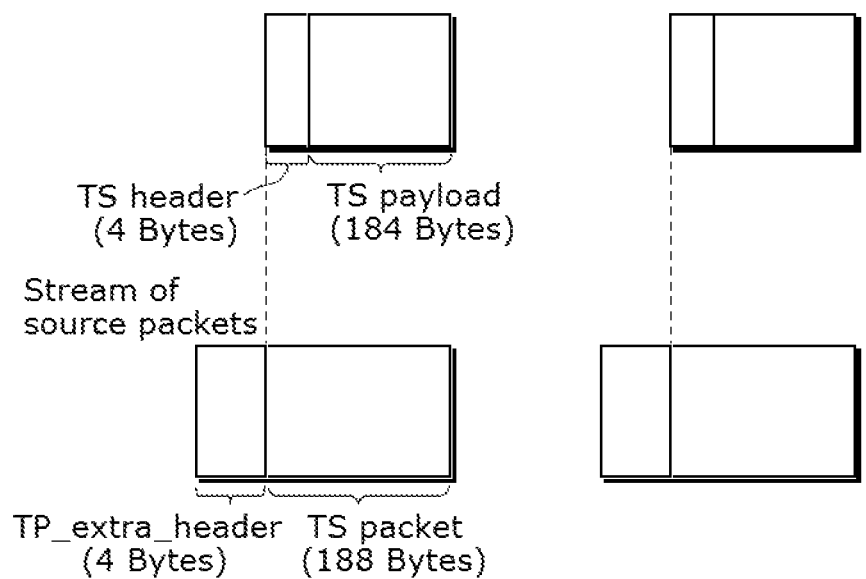
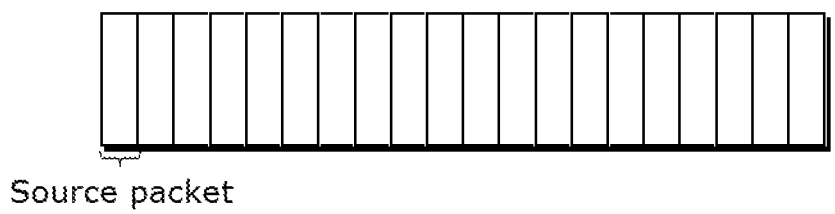

FIG. 39

| Corresponding standard | Driving frequency |
|---|---|
| MPEG-4 AVC | 500 MHz |
| MPEG-2 | 350 MHz |
| ⋮ | ⋮ | ex900 ex1000

IMAGE CODING METHOD INCLUDING SELECTING A CONTEXT FOR PERFORMING ARITHMETIC CODING ON A PARAMETER INDICATING A CODING-TARGET COEFFICIENT INCLUDED IN A SUB-BLOCK

FIELD

The present disclosure relates to an image coding technique and an image decoding technique for performing arithmetic coding and arithmetic decoding, respectively.

BACKGROUND

Recent years have seen a significant technical development in digital video apparatuses and demands for compression-coding a video signal (a plurality of pictures arranged in time series). Such a compression-coded video signal is, for example, recorded on a recording medium such as a DVD and a hard disc, and is distributed on a network. The H.264/AVC (MPEG-4 AVC) is one of the image coding standards, and, as the next-generation standard, the High Efficiency Video coding (HEVC) standard is currently being considered (Non-patent Literature 1).

The HEVC standard today involves a step of predicting an image to be coded, a step of calculating a residual between a coding-target image and a prediction image, a step of transforming the residual image into frequency coefficients, and a step of performing arithmetic coding on the frequency coefficients. In the arithmetic coding step, context adaptive arithmetic coding is performed on the components (coefficients) included in the coding-target block in the order from highest frequency components to low frequency components.

CITATION LIST

Non Patent Literature 1
Joint Collaborative Team on Video Coding (JCT-VC) of ITU-T SG16 WP3 and ISO/IEC JTC1/SC29/WG11, 6th Meeting: Torino, IT, 14-22 Jul. 2011 JCTVC-F803_d0, Title: WD4: Working Draft 4 of High-Efficiency Video Coding http://phenix.it-sudparis.eu/jct/doc_end_user/documents/6_Torino/wg11/JCTVC-F803-v2.zip

SUMMARY

Technical Problem

However, in the conventional context adaptive arithmetic coding, a large amount of load is sometimes required to select contexts for coding coding-target coefficients.

In view of this, the present disclosure provides an image coding method which enables reduction in the amount of load required to select contexts for coding coding-target coefficients.

Solution to Problem

An image coding method according to an aspect of the present disclosure is an image coding method for coding an image on a block-by-block basis and including: selecting, for each of a plurality of sub-blocks included in a coding-target block and each including a plurality of coefficients, a context for performing arithmetic coding on a parameter indicating a coding-target coefficient included in the sub-block from a context set corresponding to the sub-block, based on at least one reference coefficient located around the coding-target coefficient, the coding-target block being a transform unit; and performing arithmetic coding on the parameter indicating the coding-target coefficient using probability information about the selected context, wherein, in the selecting, the context is selected from the context set, the context set corresponding to a sum of (i) a value indicating a position in a horizontal direction of the sub-block in the coding-target block and (ii) a value indicating a position in a vertical direction of the sub-block in the coding-target block.

These general and specific aspects may be implemented using a system, an apparatus, an integrated circuit, a computer program, or a computer-readable recording medium such as a CD-ROM, or any combination of systems, methods, integrated circuits, computer programs, or computer-readable recording media.

Advantageous Effects

An image coding method according to an aspect of the present disclosure makes it possible to reduce the load of selecting contexts for coding coding-target coefficients in context adaptive arithmetic coding.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3A is a diagram for illustrating a context set for one of the coefficients included in a sub-block in the underlying knowledge forming the basis of the present disclosure.

FIG. 4 is a block diagram showing a structure of an image coding apparatus in Embodiment 1.

FIG. 11A is a diagram for illustrating a context set for one of the coefficients included in a coefficient block in Embodiment 1.

FIG. 28 illustrates a structure of multiplexed data.

FIG. 31 shows a structure of TS packets and source packets in the multiplexed data.

FIG. 39 shows an example of a look-up table in which video data standards are associated with driving frequencies.

DESCRIPTION OF EMBODIMENTS

A context for performing arithmetic coding on each of coding-target coefficients is selected according to a coded coefficient around the coding-target coefficient. The coding-target coefficient is subjected to the arithmetic coding using a symbol occurrence probability corresponding to the selected context.

In the case of a natural image, a lower frequency component has a greater coefficient value. For this reason, it is possible to bias a symbol occurrence probability by selecting a context with reference to a coded neighboring coefficient (a coefficient of a frequency component higher than the frequency component having the coding-target coefficient). For example, when the value of the coded neighboring coefficient is large, it is highly likely that the value of the coding-target coefficient is also large. For this reason, it is possible to decrease the amount of bits to be generated by using a context for a large value for use in the arithmetic coding of the coding-target coefficient when the value of the coded neighboring coefficient is large.

In addition, the plurality of coefficients in the coding-target block are divided into groups based on the frequency components thereof. Context sets exclusive for the respective groups are used. In other words, each of the coefficients is subjected to arithmetic coding using the context selected from the context set corresponding to the group to which the coefficient belongs. In the case of a natural image, large coefficients are present in a low frequency area, and small coefficients are present in a high frequency area. For this reason, it is possible to decrease the amount of bits to be generated selectively using the context sets determined differently for the coefficients in the low frequency area and for the coefficients in the high frequency area.

Figure 1:
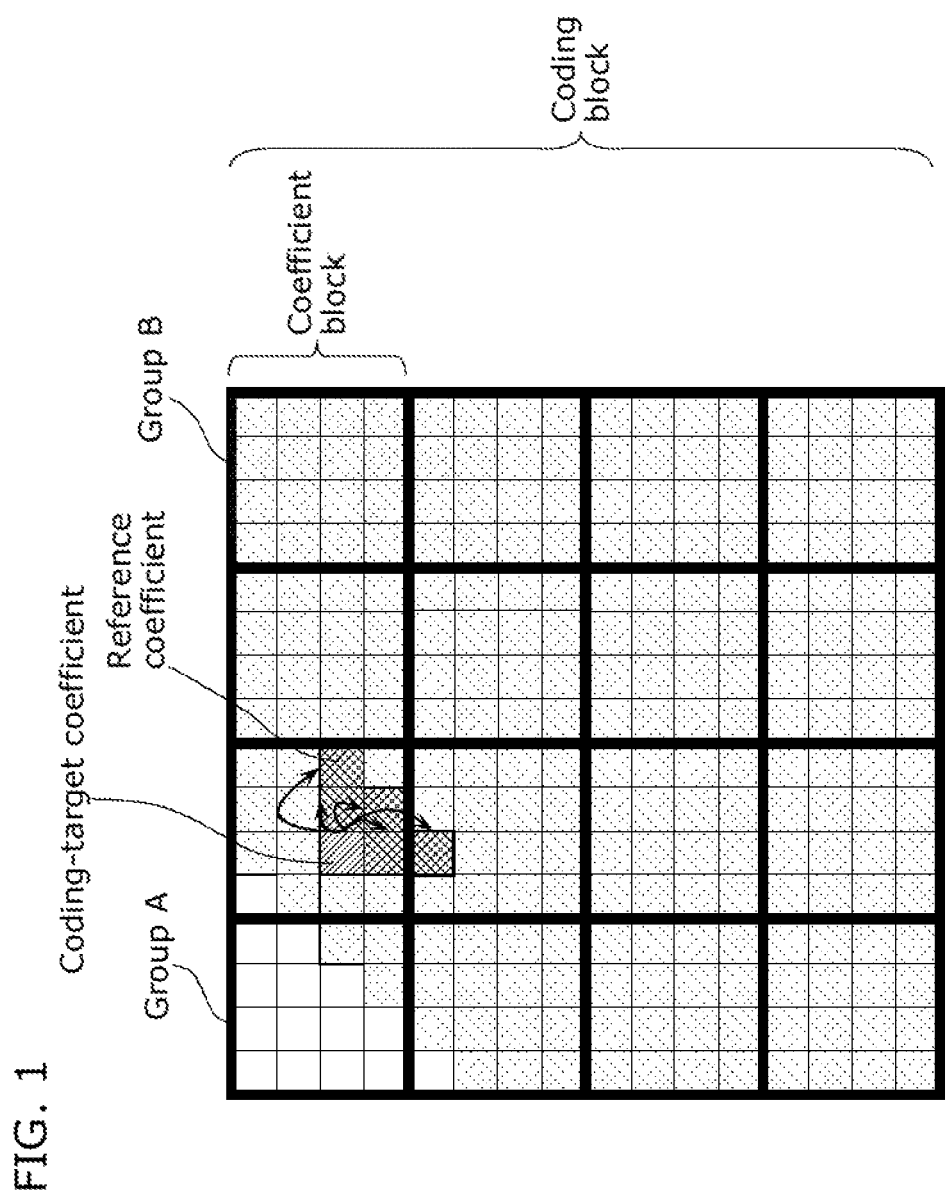
FIG. 1 is a diagram for illustrating a scheme of selecting a context for arithmetic coding of significant_flag in the underlying knowledge forming the basis of the present disclosure.

In the HEVC standard, the coefficients are represented as a plurality of parameters (such as significant_flag and greater1_flag). FIG. 1 is a diagram for illustrating a scheme of selecting a context for arithmetic coding of significant_flag.

In FIG. 1, the coding-target block includes 16×16 pixels. Each of the pixels has a coefficient. A pixel located closer to the upper left has a lower frequency component, and a pixel located closer to the lower right has a higher frequency component.

In addition, each of the pixels belongs to a group A or a group B. In FIG. 1, the group A is a group to which pixels without hatching are belong. The group B is a group to which pixels with hatching belong.

The context for performing arithmetic coding on significant_flag representing the coefficient of each pixel is selected from the contest set corresponding to the group to which the pixel belongs. For example, a context for significant_flag of the pixel located at the upper left end is selected from a context set A corresponding to the group A. On the other hand, for example, a context for significant_flag of the pixel located at the lower right end is selected from a context set B corresponding to the group B.

At this time, the context is selected from the context set, based on the coefficient of a reference pixel (a reference coefficient) located around the coding-target pixel (coding-target coefficient). In FIG. 1, the context selected from the context set is determined using a total of five reference coefficients which are two coefficients located at the right side of the coding-target coefficient, two coefficients located below the coding-target coefficient, and one coefficient located at the lower right of the coding-target coefficient.

As shown in FIG. 1, the plurality of pixels are divided into groups. Thus, as described above, the use of the reference coefficient around the coding-target coefficient makes it possible to select contexts utilizing the feature that the coefficients are biased depending on frequency coefficients, and to thereby increase the coding efficiency.

Figure 2:
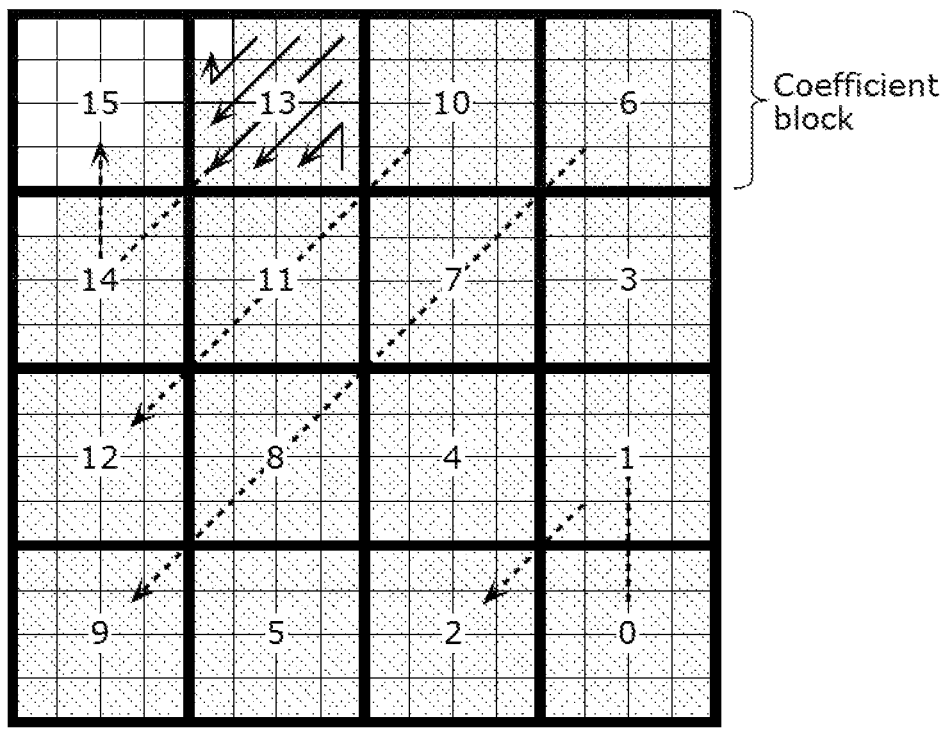
FIG. 2 is a diagram showing an order of coding the coefficients included in a coding-target block in the underlying knowledge forming the basis of the present disclosure.

FIG. 2 shows an order of coding the coefficients included in a coding-target block. In FIG. 2, the coding-target block of 16×16 pixels is divided into a plurality of sub-blocks of 4×4 pixels enclosed by bold lines. The numbers shown in the respective sub-blocks represent the coding order. In other words, the plurality of coefficients included in the coding-target block are coded on a sub-block-by-sub-block basis in the order shown by the broken arrows. In addition, the coefficients included in each of the sub-blocks are coded in the order as shown by the arrows provided in the thirteenth sub-block.

Figure 3B:
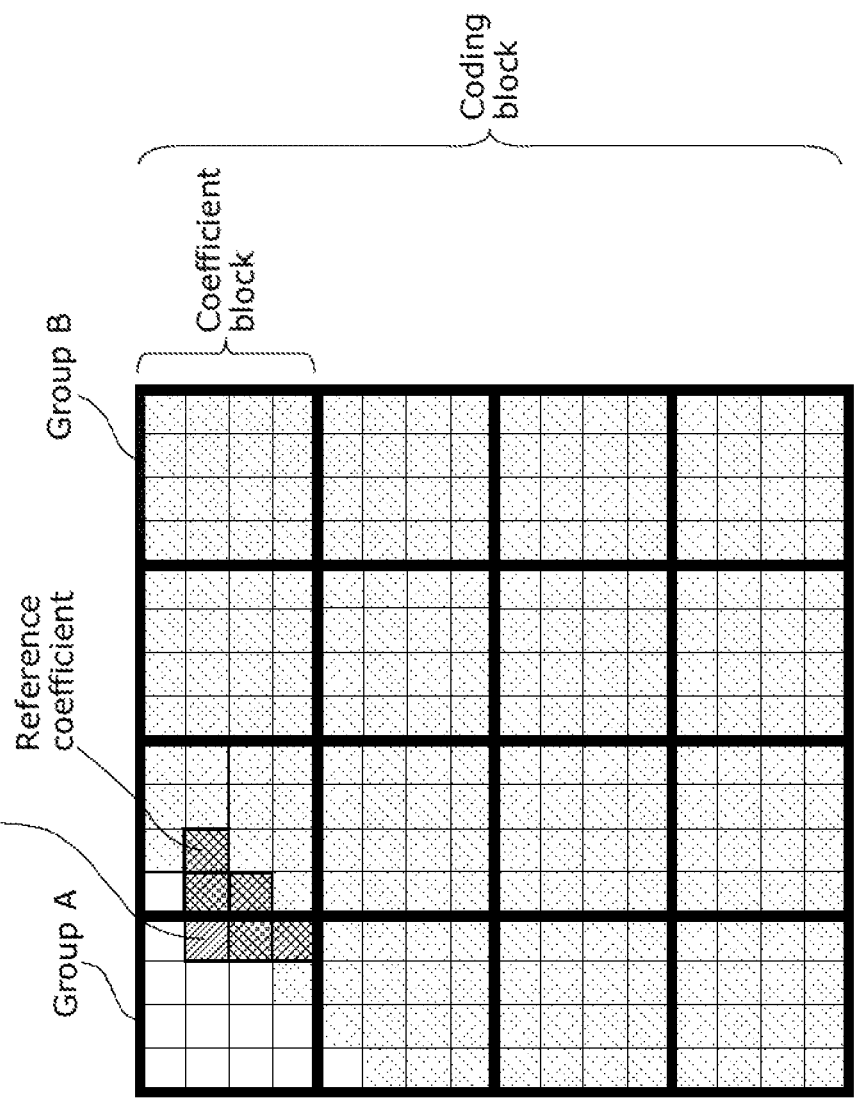
FIG. 3B is a diagram for illustrating a context set for another one of the coefficients included in a sub-block in the underlying knowledge forming the basis of the present disclosure.

Each of FIG. 3A and FIG. 3B is a diagram for illustrating a context set for different coefficients included in the sub-block located at the upper left end. The coding-target coefficient in FIG. 3A and the coding-target coefficient in FIG. 3B are included in the sub-block, but belong to different groups. In other words, the context for performing arithmetic coding on the coding-target coefficient in FIG. 3A and the context for performing arithmetic coding on the coding-target coefficient in FIG. 3B are selected from different context sets.

In other words, as shown in FIG. 1, when the plurality of pixels (the plurality of coefficients) are divided into groups, a switch between context sets is made in a sub-block. In this case, for example, there is a need to determine one of the groups to which the coefficient belongs for each of the coefficients in the sub-block. Thus, the load for selecting a context increases.

In view of this, an image coding method according to an aspect of the present disclosure is an image coding method for coding an image on a block-by-block basis and including: selecting, for each of a plurality of sub-blocks included in a coding-target block and each including a plurality of coefficients, a context for performing arithmetic coding on a parameter indicating a coding-target coefficient included in the sub-block from a context set corresponding to the sub-block, based on at least one reference coefficient located around the coding-target coefficient, the coding-target block being a transform unit; and performing arithmetic coding on the parameter indicating the coding-target coefficient using probability information about the selected context, wherein, in the selecting, the context is selected from the context set, the context set corresponding to a sum of (i) a value indicating a position in a horizontal direction of the sub-block in the coding-target block and (ii) a value indicating a position in a vertical direction of the sub-block in the coding-target block.

According to this method, it is possible to select a context from the context set corresponding to the sub-block. Accordingly, it is possible to prevent occurrence of a switch between context sets in the sub-block, and to thus reduce the load for selecting a context.

Furthermore, according to this method, it is possible to select a context from the context set corresponding to the sum of the values indicating the horizontal direction position and the vertical direction position of the sub-block in the coding-target block. Accordingly, it is possible to use the context set adapted to the coefficient variation depending on the frequency components, and to thus suppress decrease in the coding efficiency due to the use of the context set corresponding to the sub-block.

For example, in the selecting, when a horizontal-direction distance and a vertical-direction distance from a position of an upper left coefficient in the coding-target block to a position of the coding-target coefficient are denoted as H and V, respectively, and when each of the sub-blocks has a size denoted as $\alpha$ in each of the vertical direction and the horizontal direction, "an integer part of $(H/\alpha)$+an integer part of $(V/\alpha)$" may be calculated as the sum.

According to this method, it is possible to easily calculate the sum of the values indicating the horizontal direction position and the vertical direction position of the sub-block in the coding-target block.

For example, in the selecting, when the sum is smaller than or equal to a threshold value, the context is selected from a first context set; and when the sum is larger than the threshold value, the context may be selected from a second context set different from the first context set.

According to this method, it is possible to select a context from the first context set when the sum is smaller than or equal to the threshold value, and to select a context from the second context set when the sum is larger than the threshold value. Accordingly, based on the result of comparison between the sum and the threshold value, it is possible to easily make a switch between the context sets between sub-blocks.

For example, in the selecting, the threshold value may increase with an increase in the size of the coding-target block.

According to this method, the threshold value increases with an increase in the size of the coding-target block. Accordingly, when the variation in the coefficients is different depending on the size of the coding-target block, it is possible to select a context from an appropriate one of the context sets.

For example, the at least one reference coefficient may be a coefficient of a frequency component higher than a frequency component having the coding-target coefficient.

According to this method, it is possible to use, as the reference coefficient, the coefficient of a frequency component higher than the coefficient having the coding-target coefficient. In the case of a natural image, it is highly likely that the low frequency component coefficients are larger in value than the high frequency component coefficients. Accordingly, it is possible to select the appropriate context utilizing the feature of the natural image by using, as the reference coefficient, the coefficient of the frequency component higher than the coefficient having the coding-target coefficient.

For example, the parameter indicating the coding-target coefficient may be a flag indicating whether the coding-target coefficient is 0 or not.

According to this method, it is possible to code the flag indicating whether the coding-target coefficient is 0 or not, as the parameter indicating the coding-target coefficient. This flag is a parameter having a high occurrence frequency, and thus places a great influence on the coding efficiency. Furthermore, this flag is different from a parameter having a limited number of occurrence times in the sub-block, and thus there is no coefficient value variation depending on the sub-block. However, it is also possible to suppress decrease in the coding efficiency by selecting a context from the context set corresponding to the sub-block when coding such a flag.

For example, the at least one reference coefficient may be a plurality of reference coefficients, and the context selected in the selecting may correspond to the number of reference coefficients having a non-zero value among the plurality of reference coefficients.

According to this method, it is possible to select a context using the number of the reference coefficients having non-zero values from among the plurality of reference coefficients. Accordingly, it is possible to select the appropriate context based on the reference coefficients.

For example, the image coding method may further include: making a switch between a first coding process conforming to a first standard and a second coding process conforming to a second standard; adding, to a bit stream, identification information indicating one of the first standard and the second standard which supports one of the first coding process and the second coding process to which the switch is made; and when the switch is made to the first coding process, the selecting and the arithmetic coding are performed as the first coding process.

According to this method, it is possible to make a switch between the first coding process conforming to the first standard and the second coding process conforming to the second standard.

Furthermore, an image decoding method according to an aspect of the present disclosure is an image decoding method for decoding an image coded on a block-by-block basis and including: selecting, for each of a plurality of sub-blocks included in a decoding-target block and each including a plurality of coefficients, a context for performing arithmetic decoding on a parameter indicating a decoding-target coefficient included in the sub-block from a context set corresponding to the sub-block, based on at least one reference coefficient located around the decoding-target coefficient, the decoding-target block being a transform unit; and performing arithmetic decoding on the parameter indicating the decoding-target coefficient using probability information about the selected context, wherein, in the selecting, the context is selected from the context set, the context set corresponding to a sum of (i) a value indicating a position in a horizontal direction of the sub-block in the decoding-target block and (ii) a value indicating a position in a vertical direction of the sub-block in the decoding-target block.

According to this method, it is possible to select a context from the context set corresponding to the sub-block. Accordingly, it is possible to prevent occurrence of a switch between context sets in the sub-block, and to thus reduce the load for selecting the context.

Furthermore, according to this method, it is possible to select a context from the context set corresponding to the sum of the values indicating the horizontal direction position and the vertical direction position of the sub-block in the decoding-target block. Accordingly, it is possible to use the context set adapted to the coefficient variation depending on the frequency components, and to thus appropriately decode the bitstream having a coding efficiency less reduced due to the use of the context set corresponding to the sub-block.

For example, in the selecting, when a horizontal-direction distance and a vertical-direction distance from a position of an upper left coefficient in the decoding-target block to a position of the decoding-target coefficient are denoted as H and V, respectively, and when each of the sub-blocks has a size denoted as $\alpha$ in each of the vertical direction and the horizontal direction, "an integer part of $(H/\alpha)$+an integer part of $(V/\alpha)$" may be calculated as the sum.

According to this method, it is possible to easily calculate the sum of the values indicating the horizontal direction position and the vertical direction position of the sub-block in the decoding-target block.

For example, in the selecting, when the sum is smaller than or equal to a threshold value, the context is selected from a first context set; and when the sum is larger than the threshold value, the context may be selected from a second context set different from the first context set.

According to this method, it is possible to select a context from the first context set when the sum is smaller than or equal to the threshold value, and to select a context from the second context set when the sum is larger than the threshold value. Accordingly, based on the result of comparison between the sum and the threshold value, it is possible to easily make a switch between the context sets between sub-blocks.

For example, in the selecting, the threshold value may increase with an increase in the size of the decoding-target block.

According to this method, the threshold value increases with an increase in the size of the coding-target block. Accordingly, when the variation in the coefficients is different depending on the size of the decoding-target block, it is possible to select a context from an appropriate one of the context sets.

For example, the at least one reference coefficient may be a coefficient of a frequency component higher than a frequency component having the decoding-target coefficient.

According to this method, it is possible to use, as the reference coefficient, the coefficient of a frequency component higher than the frequency component having the decoding-target coefficient. In the case of a natural image, it is highly likely that the low frequency component coefficients are larger in value than the high frequency component coefficients. Accordingly, it is possible to select the appropriate context utilizing the feature of the natural image by using, as the reference coefficient, the coefficient of the frequency component higher than the frequency component having the decoding-target coefficient.

For example, the parameter indicating the decoding-target coefficient may be a flag indicating whether the decoding-target coefficient is 0 or not.

According to this method, it is possible to decode the flag indicating whether the decoding-target coefficient is 0 or not, as the parameter indicating the decoding-target coefficient. This flag is a parameter having a high occurrence frequency, and thus places a great influence on the coding efficiency. Furthermore, this flag is different from a parameter having a limited number of occurrence times in the sub-block, and thus there is no coefficient value variation depending on the sub-block. However, it is also possible to suppress decrease in the coding efficiency by selecting a context from the context set corresponding to the sub-block when coding such a flag.

For example, the at least one reference coefficient may be a plurality of reference coefficients, and the context selected in the selecting may correspond to the number of reference coefficients having a non-zero value among the plurality of reference coefficients.

According to this method, it is possible to select a context using the number of the reference coefficients having non-zero values from among the plurality of reference coefficients. Accordingly, it is possible to select the appropriate context based on the reference coefficients.

For example, the image decoding method may further include: making a switch between a first decoding process conforming to a first standard and a second decoding process conforming to a second standard, according to identification information indicating one of the first standard and the second standard and added to a bitstream; when the switch is made to the first decoding process, the selecting and the arithmetic decoding are performed as the first decoding process.

According to this method, it is possible to make a switch between the first decoding process conforming to the first standard and the second decoding process conforming to the second standard.

These general and specific aspects may be implemented using a system, an apparatus, an integrated circuit, a computer program, or a computer-readable recording medium such as a CD-ROM, or any combination of systems, methods, integrated circuits, computer programs, or computer-readable recording media.

Hereinafter, embodiments are described specifically with reference to the drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the Claims. Therefore, among the structural elements in the following exemplary embodiments, structural elements not recited in any one of the independent claims the define the most generic concept are described as arbitrary structural elements.

Embodiment 1

[Overall Structure]

FIG. 4 is a block diagram showing a structure of an image coding apparatus 100 in Embodiment 1. The image coding apparatus 100 encodes an image on a block-by-block basis. The image coding apparatus 100 includes a coding block generating unit 101, a predicting unit 102, a subtractor 103, a transforming unit 104, a variable length encoder 105, an inverse transforming unit 106, an adder 107, and a frame memory 108.

The coding block generating unit 101 divides an input image (an input picture) into a plurality of coding blocks. A coding block is, for example, a unit (transform unit) based on which frequency transform is performed. The transform unit has a size smaller than or equal to a coding unit. The coding block generating unit 101 sequentially outputs the plurality of coding blocks to the predicting unit 102 and the subtractor 103.

The predicting unit 102 generates a prediction image (prediction block) for each of the coding blocks. For example, the predicting unit 102 generates a prediction block using inter prediction or intra prediction.

The subtractor 103 subtracts the prediction image for the coding block from the image of the coding block to generate a prediction error image (residual block) for the coding block.

The transforming unit 104 performs frequency transform on the residual block to generate a plurality of frequency coefficients. It is to be noted that the transforming unit 104 quantizes the plurality of frequency coefficients as necessary to generate a plurality of quantized coefficients. Hereinafter, the frequency coefficients and the quantized coefficients are simply referred to as coefficients without being distinguished from each other.

The variable length encoder 105 performs variable length coding on the plurality of coefficients generated by the transforming unit 104. Furthermore, the variable length encoder 105 performs variable length coding on prediction information (for example, motion vector information). This variable length encoder 105 is described in detail later.

The inverse transforming unit 106 performs inverse transform on the plurality of coefficients to reconstruct a residual block.

The adder 107 adds the prediction image for the coding block and the reconstructed error image to generate a decoded image (decoded block) of the coding block.

The frame memory 108 stores such a decoded image.

[Operation (Whole)]

Figure 5:
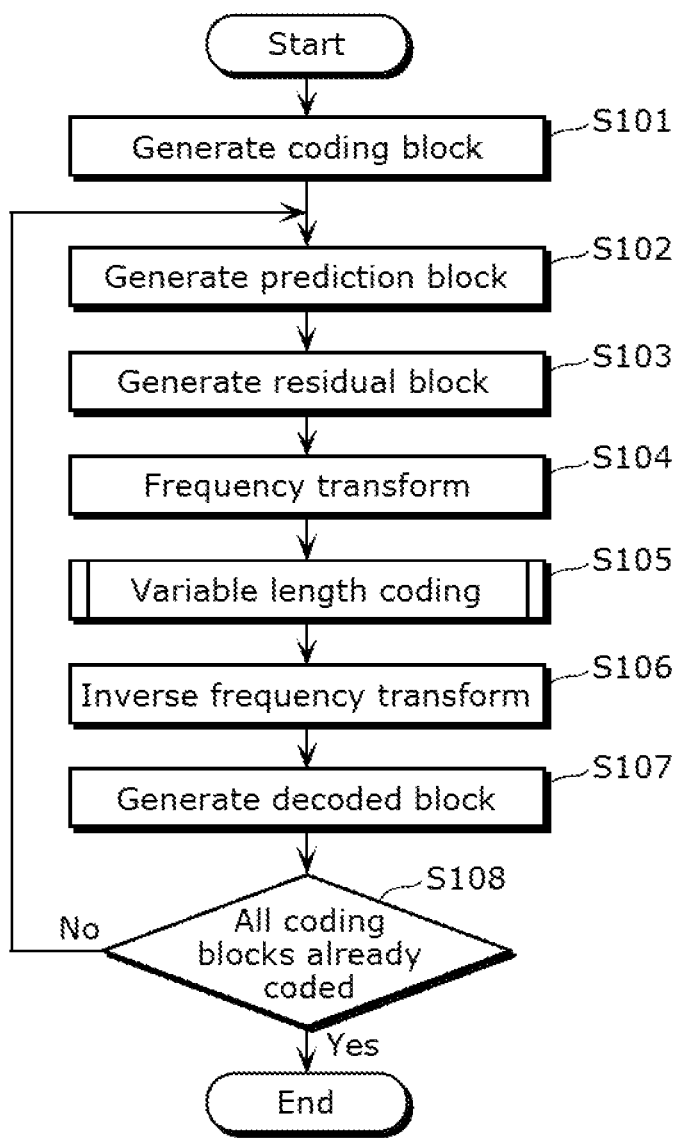
FIG. 5 is a flowchart showing a processing operation performed by the image coding apparatus in Embodiment 1.

Next, a description is given of a processing operation performed by the image coding apparatus 100 configured as described above. FIG. 5 is a flowchart showing the processing operation performed by the image coding apparatus 100 in Embodiment 1.

(Step S101)

The coding block generating unit 101 divides an input image into a plurality of coding blocks. The coding block generating unit 101 sequentially outputs the plurality of coding blocks to the subtractor 103 and the predicting unit 102.

Here, the coding block has a variable size. Accordingly, the coding block generating unit 101 divides an input image into a plurality of coding blocks based on features of the image. The minimum size for the coding block is, for example, 4×4 pixels in the horizontal and vertical sizes. The maximum size for the coding block is, for example, 32×32 pixels in the horizontal and vertical sizes.

(Step S102)

The predicting unit 102 generates a prediction block based on the coding block and the decoded image stored in the frame memory 108.

(Step S103)

The subtractor 103 subtracts the prediction block from the input image to generate a residual block.

(Step S104)

The transforming unit 104 transforms the residual block into a plurality of coefficients.

(Step S105)

The variable length encoder 105 outputs a bitstream by performing variable length coding on the plurality of coefficients.

(Step S106)

The inverse transforming unit 106 performs inverse transform on the plurality of coefficients to reconstruct a residual block.

(Step S107)

The adder 107 adds the reconstructed residual block and the prediction block to generate a decoded block. Furthermore, the adder 107 stores the generated decoded block into the frame memory 108.

(Step S108)

Step S102 to Step S107 are repeated until all the coding blocks in the input image are coded.

[Structure of Variable Length Encoder]

Figure 6:
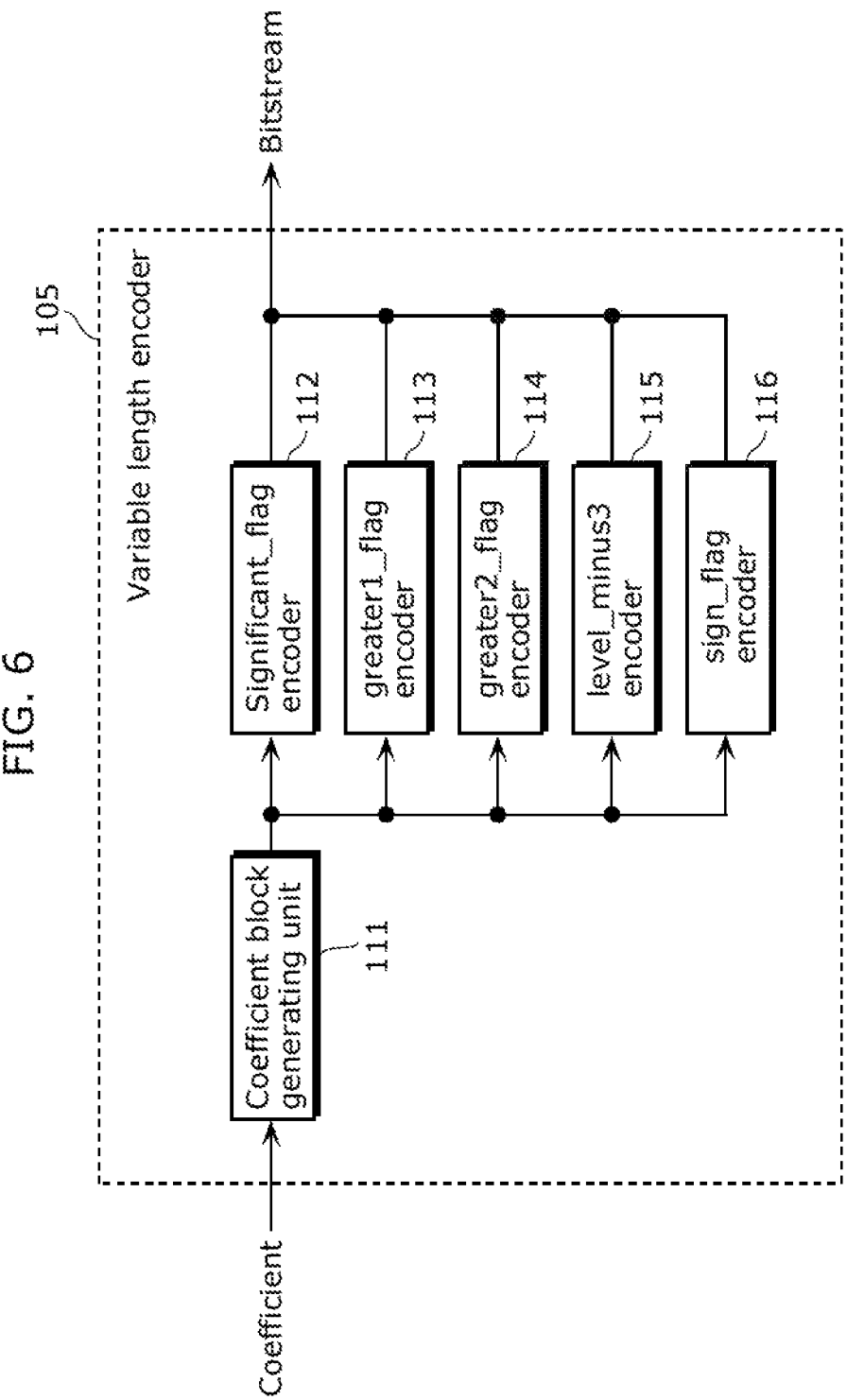
FIG. 6 is a block diagram showing an internal structure of a variable length encoder in Embodiment 1.

FIG. 6 is a block diagram showing an internal structure of a variable length encoder 105 in Embodiment 1. In this embodiment, the variable length encoder 105 performs coding using at least one of the following five parameters: significant_flag, greater1_frag, greater2_flag, level_minus3, and sign_flag. The variable length encoder 105 includes a coefficient block generating unit 111, a significant_flag encoder 112, a greater1_flag encoder 113, a greater2_flag encoder 114, a level_minus3 encoder 115, and a sign_flag encoder 116.

The coefficient block generating unit 111 divides the coding block into a plurality of coefficient blocks. The coefficient block is an example of a sub-block. In this embodiment, the coefficient block generating unit 111 divides the coding block into a plurality of coefficient blocks of 4×4 pixels. In other words, in this embodiment, each of the coefficient blocks includes sixteen coefficients.

The significant_flag encoder 112 encodes significant_flag. The significant_flag is a flag indicating whether a coefficient is "0" or not. When the value of the significant_flag is "0", it is shown that the coefficient is "0". When the value of the significant_flag is "1", it is shown that the coefficient is not "0". The significant_flag encoder 112 is described in detail later.

The greater1_flag encoder 113 encodes greater1_flag only when the significant_flag indicates "1" (only when the coefficient is not "0"). The greater1_flag is a flag indicating whether or not the absolute value of the coefficient is larger than 1 or not. When the value of the greater1_flag is "0", it is shown that the absolute value of the coefficient is "1". On the other hand, when the value of the greater1_flag is "1", it is shown that the absolute value of the coefficient is "2" or more.

The greater2_flag encoder 114 encodes greater2_flag only when the greater1_flag indicates "1" (only when the absolute value of the coefficient is "2" or more). The greater2_flag is a flag indicating whether or not the absolute value of the coefficient is larger than 2 or not. When the value of the greater2_flag is "0", it is shown that the absolute value of the coefficient is "2". On the other hand, when the value of the greater2_flag is "1", it is shown that the absolute value of the coefficient is "3" or more.

The level_minus3 encoder 115 encodes level_minus3 only when the greater2_flag indicates "1" (only when the absolute value of the coefficient is 3 or more). The level_minus 3 indicates a value obtained by subtracting "3" from the absolute value of the coefficient.

The sign_flag encoder 116 encodes sign_flag only when the significant_flag indicates "1" (only when the coefficient is not "0"). The significant_flag is a flag indicating whether the coefficient is a negative value or not. When the value of the sign_flag is "O", it is shown that the coefficient is a positive value. When the value of the sign_flag is "1", it is shown that the coefficient is a negative value.

[Operation (Variable Length Coding)]

Figure 7:
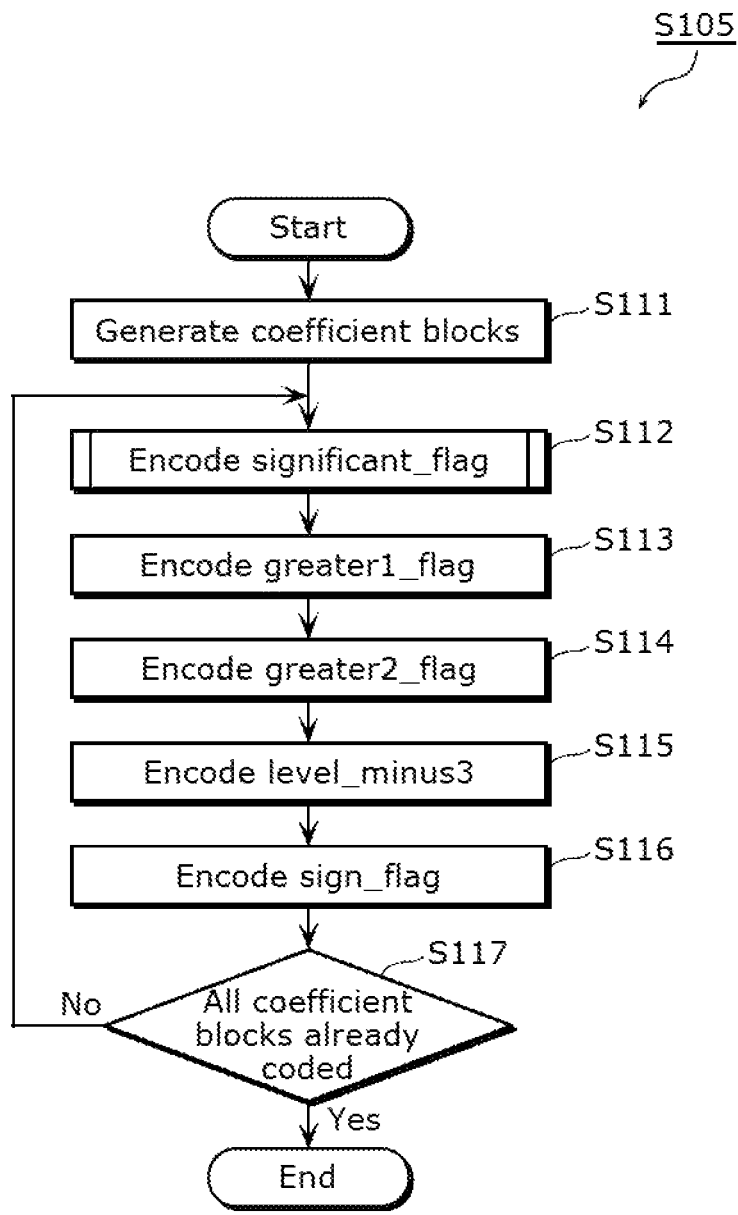
FIG. 7 is a flowchart showing a processing operation performed by the variable length encoder in Embodiment 1.

Next, a description is given of a processing operation performed by the variable length encoder 105 configured as described above. FIG. 7 is a flowchart showing the processing operation performed by the variable length encoder 105 in Embodiment 1.

(Step S111)

The coefficient block generating unit 111 divides a coding block into coefficient blocks of 4×4 pixels. For example, in the case of a coding block of 32×32 pixels, the coefficient block generating unit 111 divides the coding block by 8 horizontally and vertically. In addition, for example, in the case of a coding block of 4×4 pixels, the coefficient block generating unit 111 does not divide the coding block. It is to be noted that the following Steps S112 and S116 are performed on a basis of a coefficient block of 4×4 pixels.

(Step S112)

The significant_flag encoder 112 performs arithmetic coding on significant_flag, using a context.

(Step S113)

The greater1_flag encoder 113 performs arithmetic coding on greater1_flag, using a context.

(Step S114)

The greater2_flag encoder 114 performs arithmetic coding on greater2_flag, based on a context.

(Step S115)

The level_minus3 encoder 115 performs arithmetic coding on lelvel_minus3. More specifically, the level1_minus3 encoder 115 performs arithmetic coding using a fixed symbol occurrence probability (50%), without using a context.

(Step S116)

The significant_flag encoder 116 performs arithmetic coding on significant_flag. More specifically, the sign_flag encoder 116 performs arithmetic coding using a fixed symbol occurrence probability (50%), without using a context, in the same manner as the level_minus3 encoder 115 does.

(Step S117)

Step S112 to Step S116 are repeated until all the coefficient blocks in the coding block are coded.

[Structure of Significant_Flag Encoder]

Figure 8:
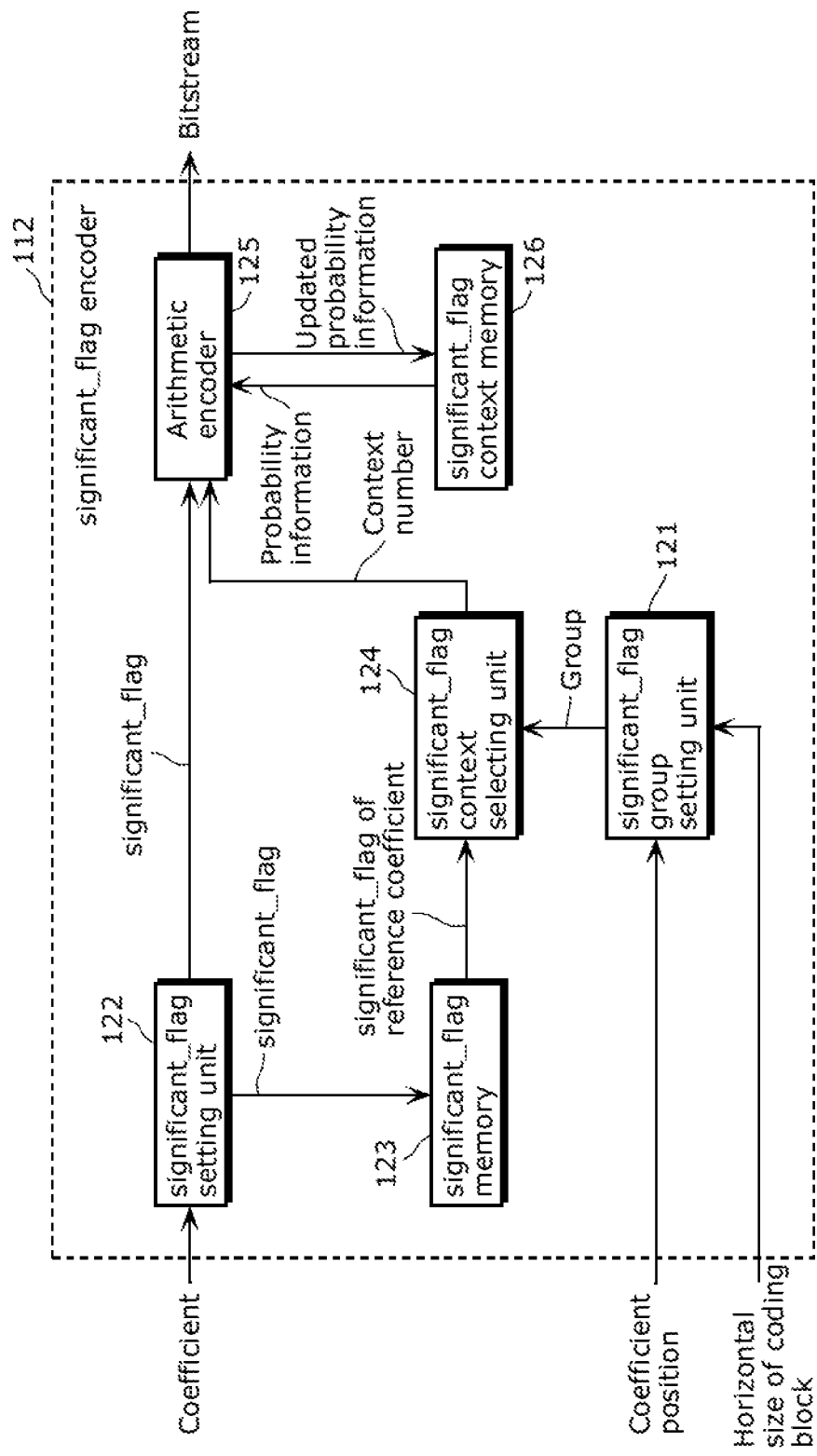
FIG. 8 is a block diagram showing an internal structure of a significant_flag encoder in Embodiment 1.

FIG. 8 shows an internal structure of a significant_flag encoder 112 in Embodiment 1. The significant_flag encoder 112 includes a significant_flag group setting unit 121, a significant_flag setting unit 122, a significant_flag memory 123, a significant_flag context selecting unit 124, an arithmetic encoder 125, and a significant_flag context memory 126.

The significant_flag group setting unit 121 divides the plurality of coefficient blocks included in the coding block into groups. More specifically, the significant flag group setting unit 121 divides the plurality of coefficient blocks into the groups, based on the sum of the values indicating the horizontal direction position and the vertical direction position of each of the coefficient blocks in the coding block. More specifically, the significant_flag group setting unit 121 divides the plurality of coefficient blocks into the groups, for example, based on whether the sum is smaller than or equal to a threshold value (a threshold value for group determination) or the sum is larger than the threshold value.

The values indicating the horizontal direction position and vertical direction position of the coefficient block are derived from the values indicating the horizontal direction positions (the horizontal positions of the coefficients) and vertical direction positions (the vertical positions of the coefficients) of the respective coefficients included in the coefficient block. More specifically, for example, the significant_flag group setting unit 121 derives "the integer part of (the horizontal positions of the coefficients/the horizontal size of the coefficient block)" as the value indicating the horizontal direction position of the coefficient block. In addition, for example, the significant_flag group setting unit 121 derives "the integer part of (the vertical positions of the coefficients/the vertical size of the coefficient block)" as the value indicating the vertical direction position of the coefficient block Here, it is possible to use, as the horizontal position and vertical position of the coefficient included in the coefficient block, the horizontal and vertical direction distances from the position of the upper left coefficient in the coding block and the position of the coefficient in the coefficient block.

The significant_flag setting unit 122 reads out, for each coefficient block, a plurality of coefficients included in the coefficient block. The significant_flag setting unit 122 sets a value to the significant_flag for the coefficient, based on whether or not the read-out coefficient is "0" or not. In this embodiment, the significant_flag setting unit 122 sets "0" to the significant_flag when the coefficient is "0", and sets "1" to the significant_flag when the coefficient is "1".

Furthermore, the significant_flag setting unit 122 stores the significant_flag for each coefficient into the significant_flag memory 123.

The significant_flag memory 123 stores the significant_flag for each coefficient.

The significant_flag context selecting unit 124 selects, for each coefficient block, a context for arithmetic coding of a parameter indicating a current processing-target coefficient (coding-target coefficient) included in the coefficient block from the context set corresponding to the coefficient block, based on at least one reference coefficient around the coding-target coefficient. More specifically, the significant_flag context selecting unit 124 selects a context from the context set corresponding to the sum of the values indicating the horizontal direction position and the vertical direction position of the coefficient block in the coding block.

The arithmetic encoder 125 obtains the probability information about the selected context from the significant_flag context memory 126. The arithmetic encoder 125 performs arithmetic coding on the parameter indicating the processing-target coefficient using the obtained context probability information. In this embodiment, the parameter is the significant_flag.

Furthermore, the arithmetic encoder 125 updates the context probability information stored in the significant_flag context memory 126, according to the value of the significant_flag.

The significant_flag context memory 126 stores the probability information about each context.

[Operation (Coding of Significant_Flag)]

Figure 9:
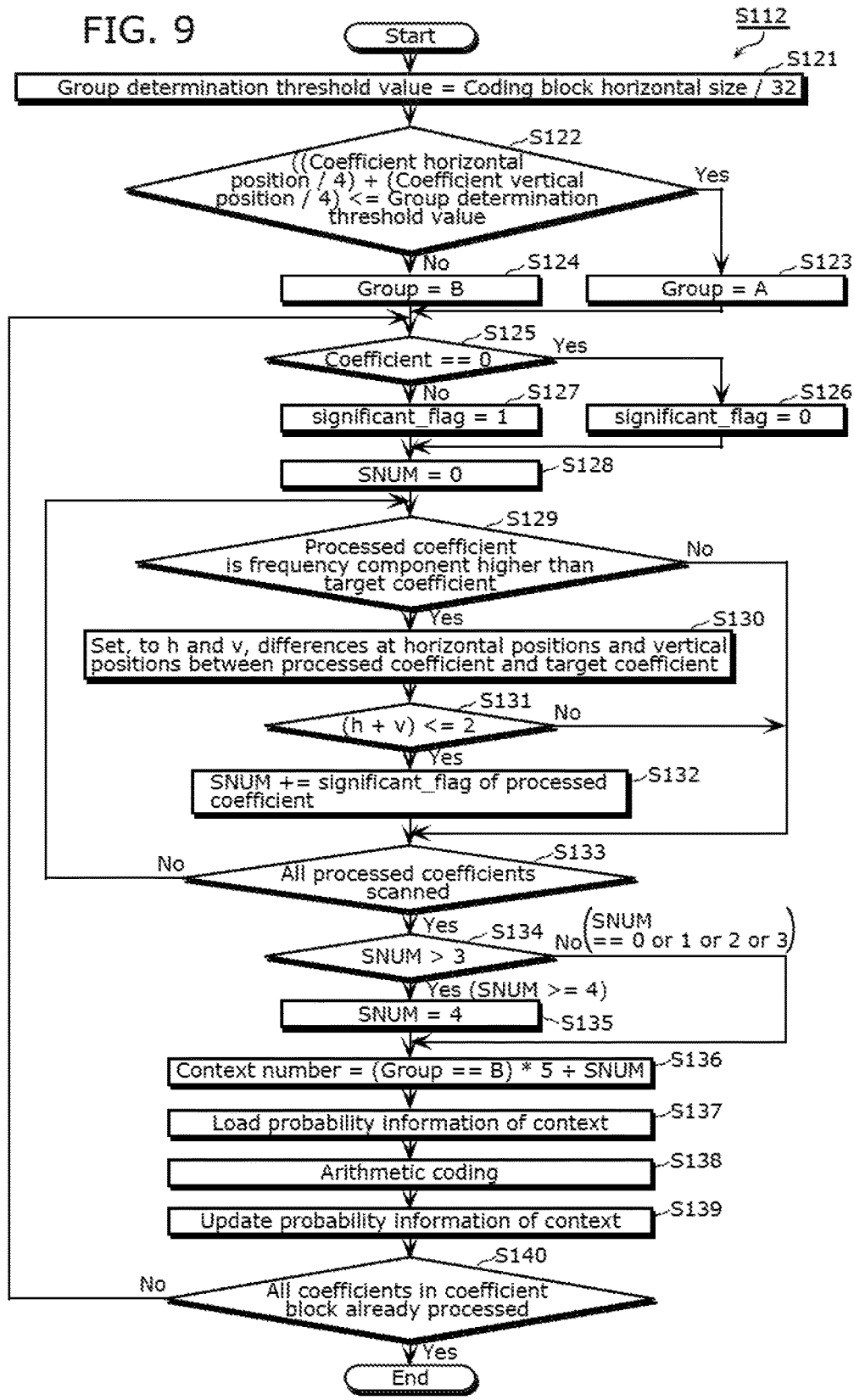
FIG. 9 is a flowchart showing a processing operation performed by the significant_flag encoder in Embodiment 1.

Next, a description is given of the significant_flag encoder 112 configured as described above. FIG. 9 shows a processing operation performed by the significant_flag encoder 112 in Embodiment 1. It is to be noted that the order of coding the plurality of coefficients included in the coefficient blocks is the same as in FIG. 2. In other words, the significant_flag is coded on a per coefficient block basis.

(Step S121)

The significant_flag group setting unit 121 calculates a group determination threshold value. For example, the significant_flag group setting unit 121 divides the horizontal size of the coding block by, for example, "16". Next, the significant_flag group setting unit 121 sets the integer part of the division result as the group determination threshold value.

In other words, the significant_flag group setting unit 121 calculates a larger threshold value for a larger coding block size. In this way, when the coefficients are biased depending on the coding block size, it is possible to associate an appropriate context set with the coefficient block. It is to be noted that the threshold value may be a certain value which does not depend on a coding block size. In this case, the significant_flag group setting unit 121 may calculate the threshold value without using the coding block size.

(Step S122)

The significant_flag group setting unit 121 adds the integer part of "the coefficient horizontal position/4" and the integer part of "the coefficient vertical position/4". Next, the significant_flag group setting unit 121 compares the addition result with the group determination threshold value which is set in Step S121. Here, a transition to Step S123 is made when the addition result is smaller than or equal to the group determination threshold value, and otherwise, a transition to S124 is made.

The coefficient horizontal position and the coefficient vertical position are the horizontal and vertical direction positions of the processing-target coefficients in the coding block or values indicating the horizontal and vertical direction positions of the processing-target coefficients. Here, the coefficient horizontal position and the coefficient vertical position are horizontal and vertical direction distances (the number of pixels) from the upper left coefficient to the processing-target coefficient in the coding block. In short, in the case of the upper left coefficient, the coefficient horizontal position and the coefficient vertical position are both "0". It is to be noted that each of the coefficient horizontal position and the coefficient vertical position is divided by "4" because the horizontal size and the vertical size of the coefficient block is "4".

(Step S123)

The significant_flag group setting unit 121 sets "A" to the group.

(Step S124)

The significant_flag group setting unit 121 sets "B" to the group.

Figure 10A:
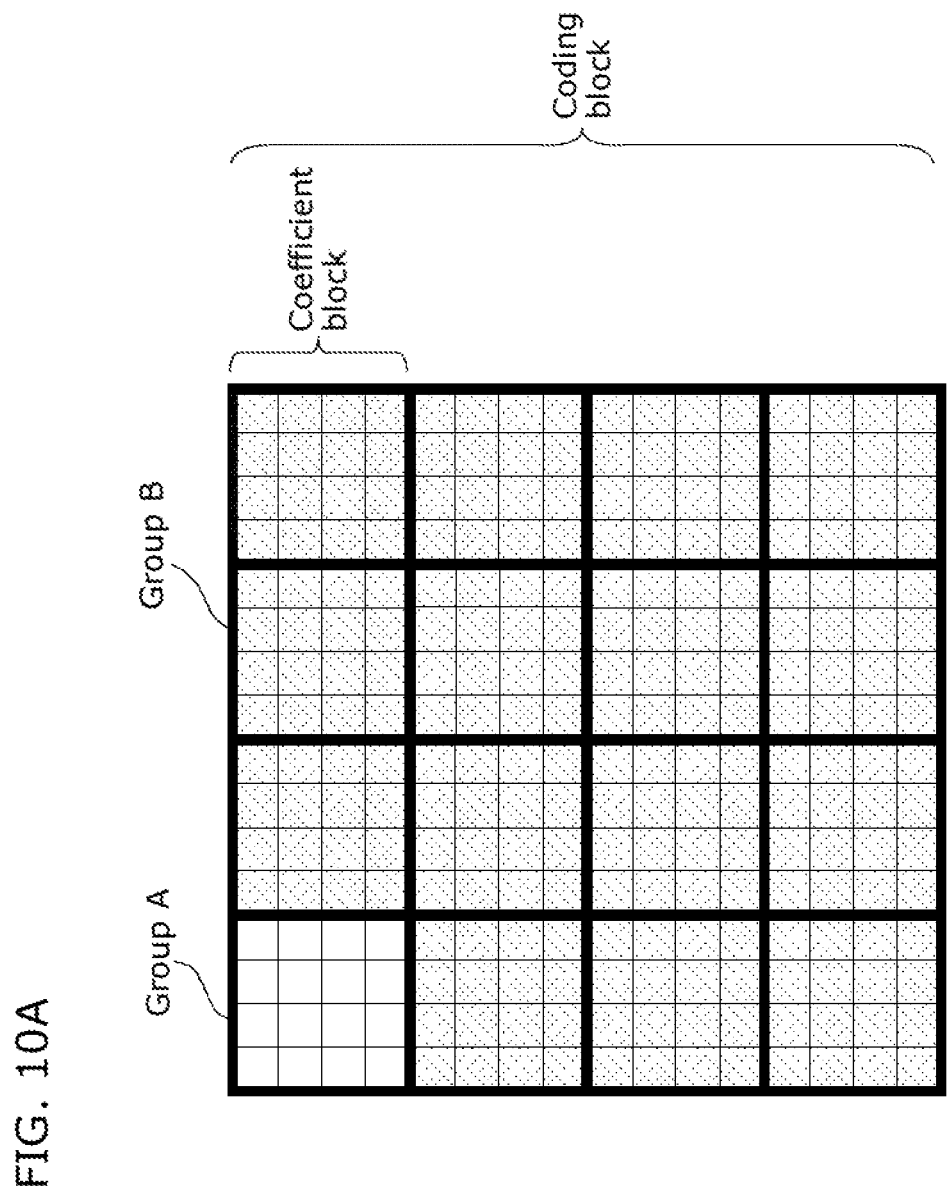
FIG. 10A is a diagram showing an example of a result of grouping in the case of a coding block of 16×16 pixels in Embodiment 1.
Figure 10B:
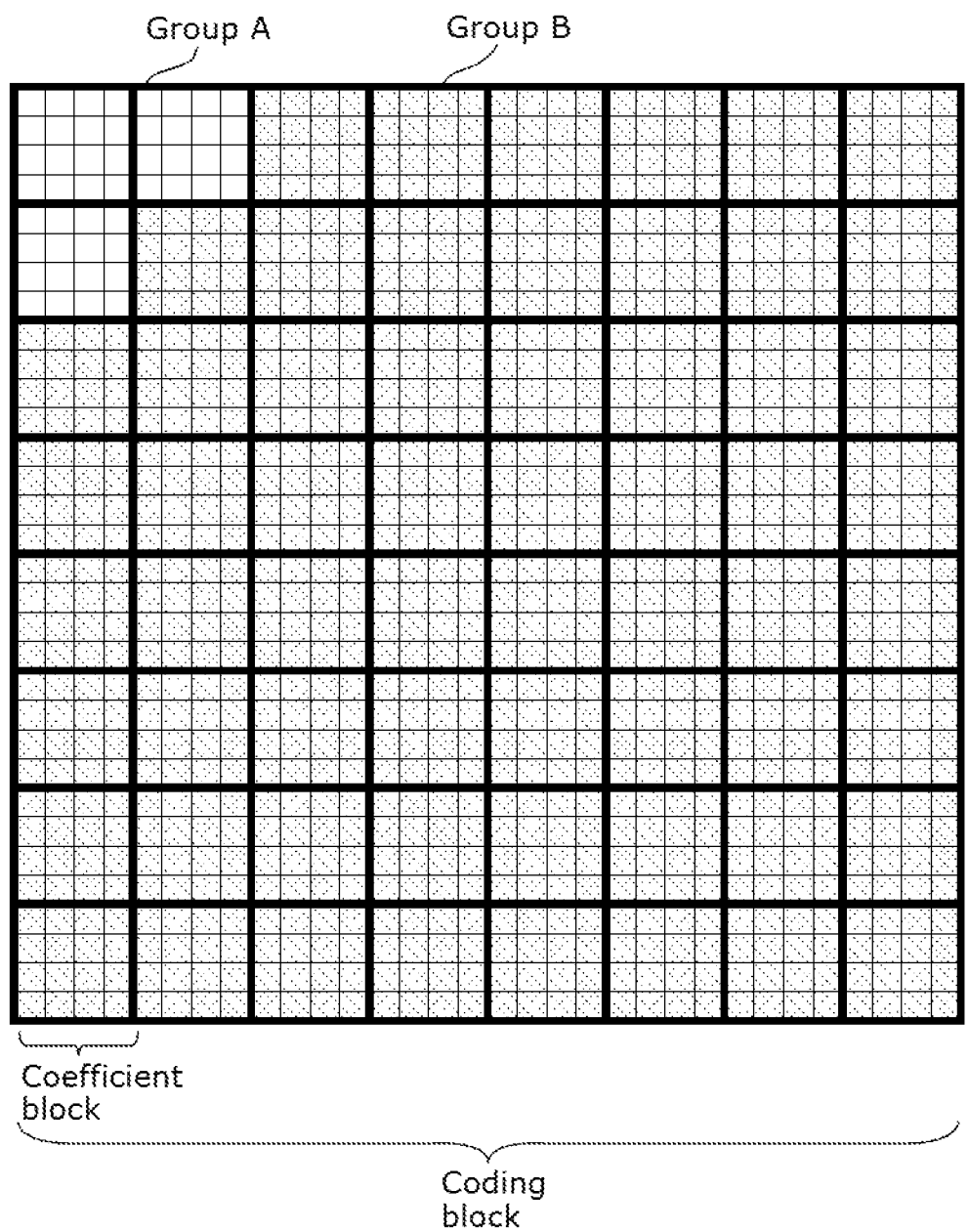
FIG. 10B is a diagram showing an example of a result of grouping in the case of a coding block of 32×32 pixels in Embodiment 1.

FIG. 10A shows an example of a grouping result in the case of a coding block of 16×16 pixels. FIG. 10B shows an example of a grouping result in the case of a coding block of 32×32 pixels.

As shown in FIG. 10A, in the case of the coding block of 16×16 pixels, only the upper left corner coefficient block is included in the group A. As shown in FIG. 10B, in the case of the coding block of 32×32 pixels, three coefficient blocks at the upper left side is included in the group A.

The following Steps S125 to S139 are processes performed for each coefficient in the coefficient block, and are repeated until all the coefficients in the coefficient block are processed.

(Step S125)

The significant_flag setting unit 122 determines whether or not the processing-target coefficient is "0". A transition to Step S126 is made when the processing-target coefficient is "0", and a transition to Step S127 is made when the processing-target coefficient is not "0".

(Step S126)

The significant_flag setting unit 122 sets "0" to the significant_flag.

The significant_flag setting unit 122 outputs the significant_flag having a set value "0" to the arithmetic encoder 125 and the significant_flag memory 123.

(Step S127)

The significant_flag setting unit 122 sets "1" to the significant_flag. The significant_flag setting unit 122 outputs the significant_flag having a set value "1" to the arithmetic encoder 125 and the significant_flag memory 123.

(Step S128)

The significant_flag context selecting unit 124 sets "0" to SNUM to be used in the following processing.

It is to be noted that the following Steps from S129 to S132 are performed for each processed coefficient, and are repeated until all the processed coefficients are processed.

(Step S129)

The significant_flag context selecting unit 124 determines whether or not the processed coefficient is of a frequency component higher than the frequency component having processing-target coefficient. A transition to Step S130 is made when the processed coefficient is of the frequency component higher than the frequency component having processing-target coefficient, and otherwise, a transition to Step S133 is made. In other words, the significant_flag context selecting unit 124 uses, as a reference coefficient, the coefficient of the frequency component coefficient higher than the frequency component having the processing-target coefficient.

It is to be noted that the significant_flag context selecting unit 124 determines whether or not the processed coefficient is of the frequency component higher than the frequency component having processing-target coefficient, by determining the presence direction of the processed coefficient from among the directions of right, lower, and lower right with respect to the processing-target coefficient.

(Step S130)

The significant_flag context setting unit 124 calculates the difference between the positions of the processed coefficient and the processing-target coefficient, and sets a horizontal position difference to h and set a vertical position difference to v.

(Step S131)

The significant_flag context selecting unit 124 determines whether or not the sum of the h and v set in Step S130 is smaller than or equal to "2". Here, a transition to Step S132 is made when the sum of the h and v is smaller than or equal to "2", and otherwise, a transition to Step S133 is made. In other words, the significant_flag context selecting unit 124 uses, as the reference coefficient, the processed coefficient having "2" or less as the sum of the h and v, and does not use, as the reference coefficient, any processed coefficient having "3" or more as the sum of the h and v. In other words, the following five coefficients in total are used as reference coefficients: the coefficients located, with respect to the processing-target coefficient, immediately right, next immediately right, immediately below, next below, and lower right. The positions of the reference coefficients are the same as the positions of the reference coefficients shown in FIG. 1.

(Step S132)

The significant_flag context selecting unit 124 loads the value of the significant_flag of the processed coefficient (reference coefficient) from the significant_flag memory 123, and adds the loaded value to SNUM.

(Step S133)

The significant_flag context selecting unit 124 repeats Steps S129 to S132 until all the processed coefficients in the coding block are processed.

As the result of the processes from Step S129 to S132, the number of reference coefficients having "1" as the value of the significant_flag is set as the final SNUM, from among the reference coefficients around the processing-target coefficient. In short, the SNUM shows the number of reference coefficients having a non-zero value from among the plurality of reference coefficients. Here, the SNUM takes a value in a range from 0 to 5.

(Step S134)

The significant_flag context selecting unit 124 determines whether or not the SNUM is larger than "3". Here, a transition to Step S135 is made when the SNUM is larger than "3", and otherwise, a transition to Step S136 is made.

(Step S135)

The significant_flag context selecting unit 124 sets "4" to the SNUM. In other words, the significant_flag context selecting unit 124 re-sets the value of the SNUM such that the value of the SNUM does not exceed "4".

(Step S136)

The significant_flag context selecting unit 124 sets the SNUM as the context number when the coefficient block including the processing-target coefficient is included in the group A. On the other hand, when the coefficient block including the processing-target coefficient is included in the group B, the significant_flag context selecting unit 124 sets, as the context number, a result obtained by adding "5" to a SUM.

As a result, one of the context indices indicated by the context numbers 0 to 4 is selected for the arithmetic coding of the processing-target coefficient in the coefficient block included in the group A, and one of the context indices indicated by the context numbers 5 to 9 is selected for the arithmetic coding of the processing-target coefficient in the coefficient block included in the group B.

In other words, the significant_flag context selecting unit 124 selects a context from a first context set (contexts with context numbers 0 to 4) when the sum of the horizontal and vertical direction positions of the coefficient block is smaller than or equal to the threshold value. In addition, the significant_flag context selecting unit 124 selects a context from a second context set (contexts with context numbers 5 to 9) when the sum of the horizontal and vertical direction positions of the coefficient block is smaller than or equal to the threshold value. In other words, one of the context sets to be used is selected depending on the group to which the coefficient block belongs.

In addition, the context to be selected from the determined context set is determined depending on the SNUM (the number of reference coefficients having a non-zero value from among the plurality of reference coefficients). In other words, the significant_flag context selecting unit 124 selects the context corresponding to the number of reference coefficients having a value that is not "0" from among the reference coefficients (stated inversely, the number of reference coefficients having a "0" value).

(Step S137)

The arithmetic encoder 125 loads context probability information from the significant_flag contest memory 126, according to the context number.

(Step S138)

The arithmetic encoder 125 outputs a bitstream by performing arithmetic coding on the significant_flag using the probability information.

(Step S139)

The arithmetic encoder 125 updates the context probability information depending on the value of the significant_flag, and stores the updated context probability information into the significant_flag context memory 126.

(Step S140)

Steps S125 to S139 are repeated until all the coefficients in the coefficient block are processed.

Although a determination on the group to which the coefficient block belongs is made on a per coefficient block basis in FIG. 9, such a determination may be made on a coefficient-by-coefficient basis. In other words, a return to Step S125 is made when the determination result in Step S140 is No, but it is possible to make a return to Step S122 instead. Even in this case, it is possible to prevent occurrence of a switch between context sets in a coefficient block. Furthermore, in this case, it is only necessary to load the context set corresponding to the determined group from the memory, and thus it is possible to reduce the load to be placed onto the memory.

Advantageous Effects

As described above, according to the image coding apparatus 100 in this embodiment, it is possible to suppress decease in the coding efficiency, and to reduce the load for context selection. This advantageous effect is described in detail with reference to the drawings.

Figure 11B:
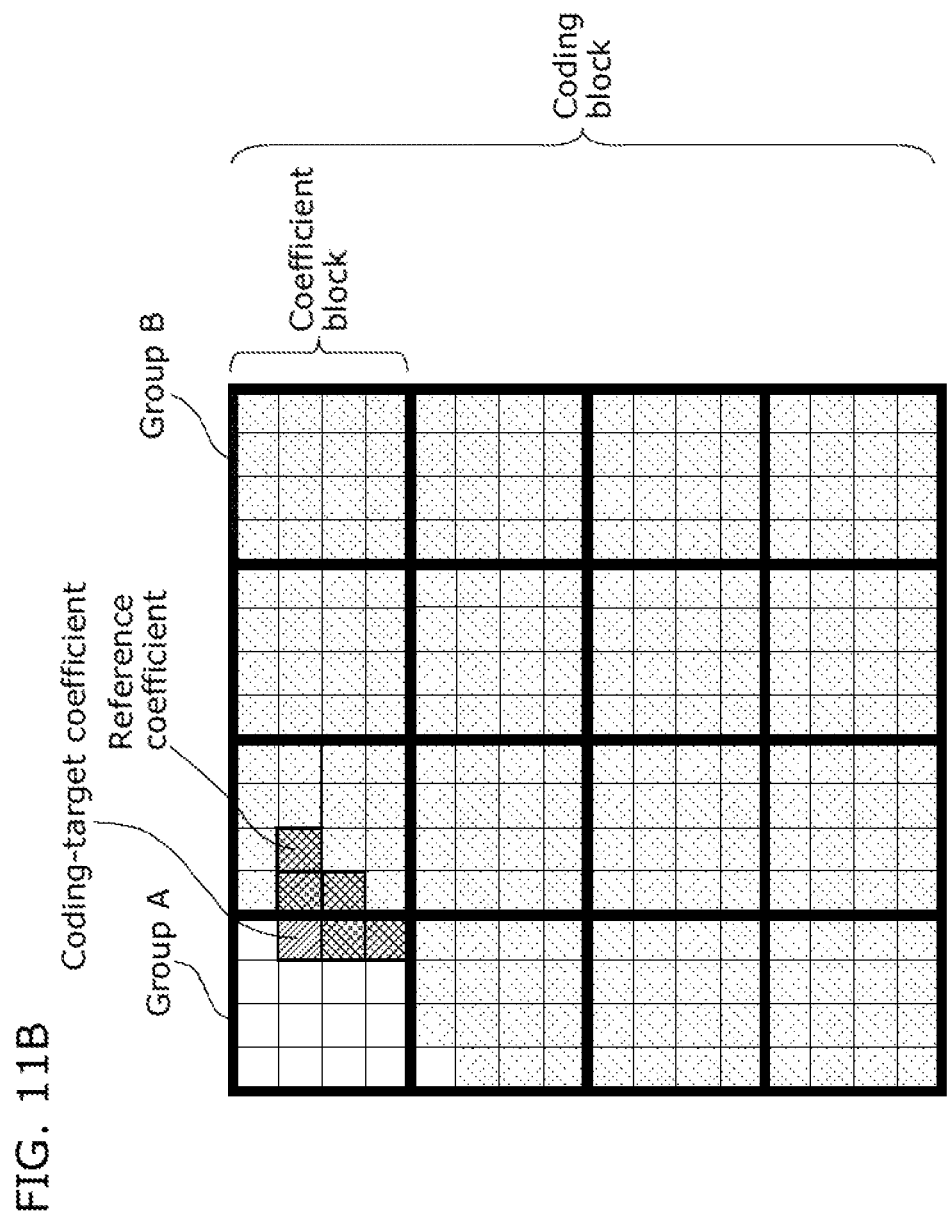
FIG. 11B is a diagram for illustrating a context set for another one of the coefficients included in the coefficient block in Embodiment 1.

FIG. 11A and FIG. 11B are diagrams for illustrating context sets for different coefficients included in a coefficient block in Embodiment 1. In the cases shown in FIGS. 11A and 11B, there is no switch such as the switch between groups (context sets) in the coefficient block as shown in FIGS. 3A and 3B. Accordingly, the image coding apparatus 100 does not need to determine, for each coefficient, one of the context sets which includes a context to be selected. Thus, it is possible to reduce the load for context selection.

Furthermore, the image coding apparatus 100 can select a context from the context set corresponding to the sum of the horizontal and vertical direction positions of the coefficient block in the coding block. Accordingly, it is possible to use the context set adapted to the coefficient variation depending on the frequency components, and to thus suppress decrease in the coding efficiency due to the use of the context set corresponding to the coefficient block.

In addition, according to the image coding apparatus 100 in this embodiment, it is possible to select a context from the context set corresponding to the coefficient block when performing arithmetic coding on the significant flag. The significant_flag is a parameter having a high occurrence frequency, and thus places a great influence on the coding efficiency. In addition, the significant_flag is a parameter for which no restriction in the number of occurrence times is placed in the coefficient block, and is free from value variation depending on a coefficient block. The Inventors have found that selecting a context from the context set corresponding to the coefficient block when coding the significant_flag does not decrease the coding efficiency. In other words, the image coding apparatus 100 is capable of reducing the load for context selection and concurrently suppressing decrease in the coding efficiency, in the arithmetic coding of the significant_flag.

Embodiment 2

[Overall Structure]

Figure 12:
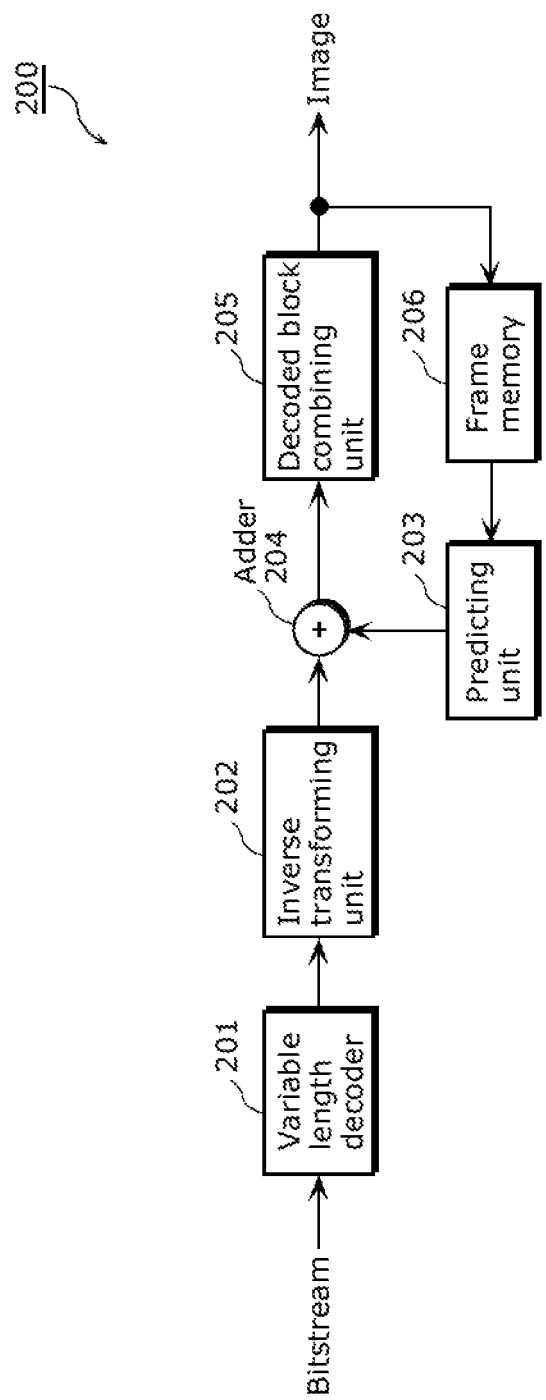
FIG. 12 is a block diagram showing a structure of an image decoding apparatus in Embodiment 2.

FIG. 12 shows a structure of an image decoding apparatus 200 in Embodiment 2. The image decoding apparatus 200 decodes an image coded on a block-by-block basis. More specifically, the image decoding apparatus 200 decodes an image coded by the image coding apparatus 100 in Embodiment 1. The image decoding apparatus 200 includes a variable length decoder 201, an inverse transforming unit 202, a predicting unit 203, an adder 204, a decoded block combining unit 205, and a frame memory 206.

The variable length decoder 201 performs variable decoding on a bitstream to obtain a plurality of coefficients and prediction information (for example, motion vector information etc.) for each of decoding-target blocks.

The inverse transforming unit 202 performs inverse transform on a plurality of coefficients to generate error images (residual blocks) of the respective decoding-target blocks.

The predicting unit 203 generates a prediction image (a prediction block) for each decoding-target block using the prediction information and a decoded image (decoded picture) stored in the frame memory 206.

The adder 204 adds the error image of the decoding-target block and the prediction image to generate the decoded image (decoded block) of the decoding-target block.

The decoded block combining unit 205 combines the plurality of decoded blocks to generate a decoded image. Furthermore, the decoded block combining unit 205 stores the decoded image into the frame memory 206.

The frame memory 206 stores such a decoded image.

[Operation (Whole)]

Figure 13:
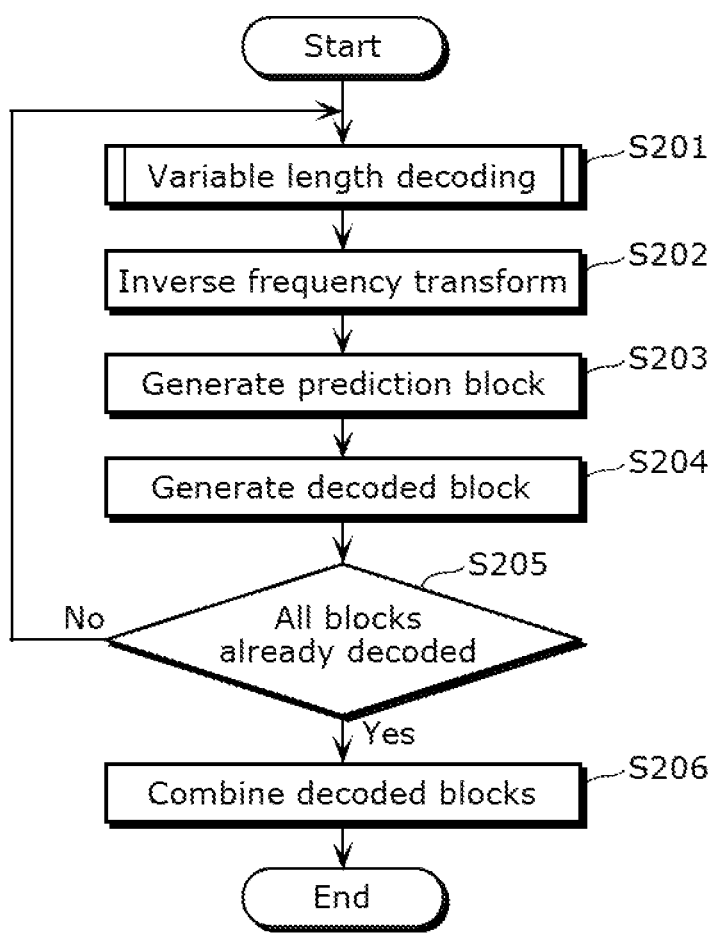
FIG. 13 is a flowchart showing a processing operation performed by the image decoding apparatus in Embodiment 2.

Next, a description is given of a processing operation performed by the image decoding apparatus 200 configured as described above. FIG. 13 is a flowchart showing a processing operation performed by the image decoding apparatus 200 in Embodiment 2.

(Step S201)

The variable length decoder 201 performs variable length decoding on a bitstream to obtain a plurality of coefficients and prediction information. Next, the variable length decoder 201 outputs the plurality of coefficients to the inverse transforming unit 202, and outputs the prediction information to the predicting unit 203.

(Step S202)

The inverse transforming unit 202 performs inverse transform on the plurality of coefficients to generate a residual block.

(Step S203)

The predicting unit 203 generates a prediction block using a decoded image stored in the frame memory 206 and the prediction information decoded by the variable length decoder 201.

(Step S204)

The adder 204 adds the prediction block and the residual block to generate a decoded block.

(Step S205)

Steps S201 to S204 are repeated until all the blocks in the image are decoded.

(Step S206)

The decoded block combining unit 205 combines the decoded blocks to generate a decoded image. Furthermore, the decoded block combining unit 205 stores the decoded image into the frame memory 206.

[Structure of Variable Length Decoder]

Figure 14:
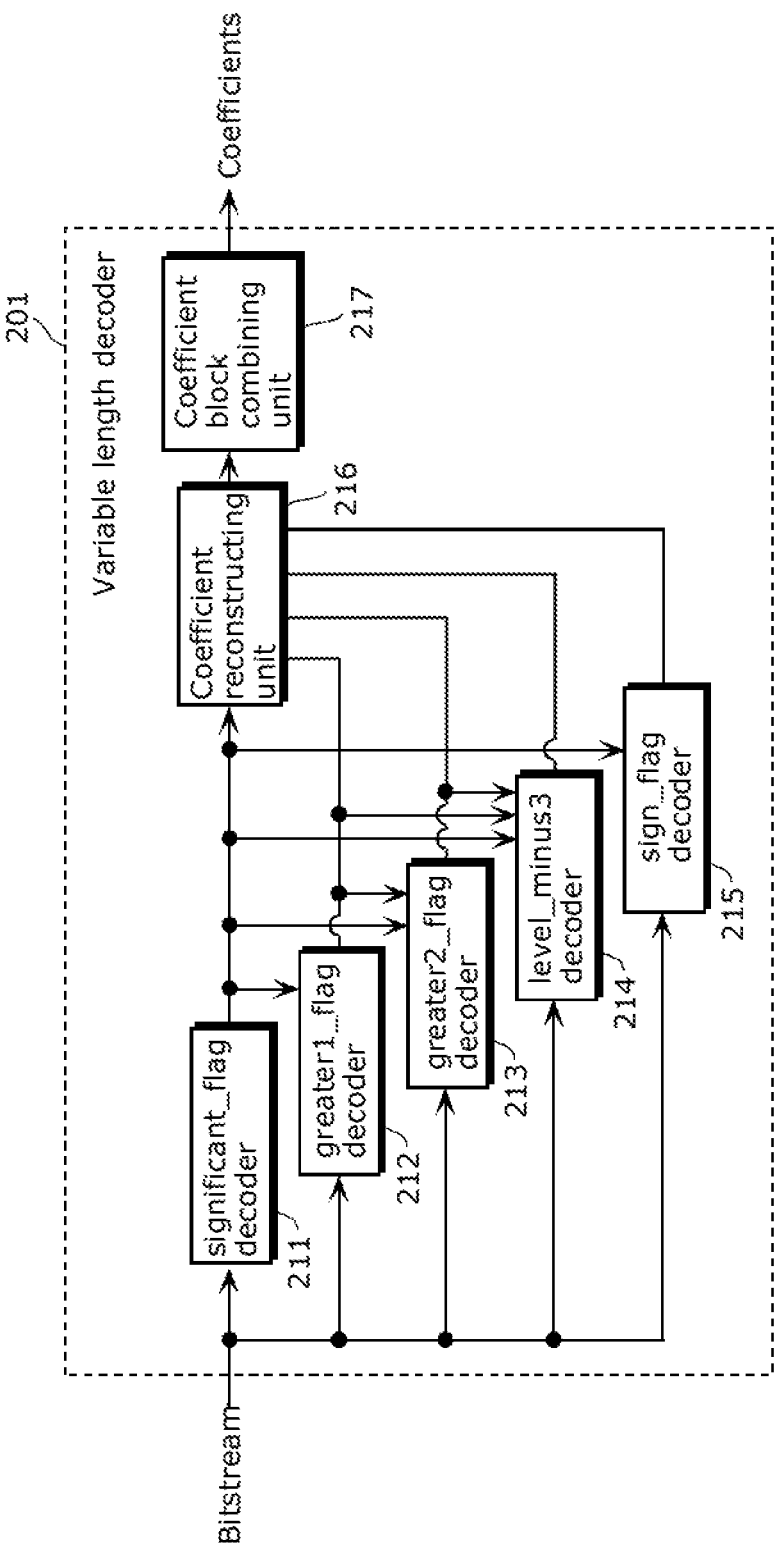
FIG. 14 is a block diagram showing an internal structure of a variable length decoder in Embodiment 2.

FIG. 14 shows an internal structure of a variable length decoder 201 in Embodiment 2. In this embodiment as in Embodiment 1, each of the coefficients is represented using at least one of the following five parameters: significant_flag, greater1_frag, greater2_flag, level_minus3, and sign_flag. Each of the parameters has the same meaning as in Embodiment 1, and thus the same description is not repeated.

The variable length decoder 201 includes a significant_flag decoder 211, a greater1_flag decoder 212, a greater2_flag decoder 213, a level_minus3 decoder 214, a sign_flag decoder 215, a coefficient reconstructing unit 216, and a coefficient block combining unit 217.

[Operation (Variable Length Decoding)]

Figure 15:
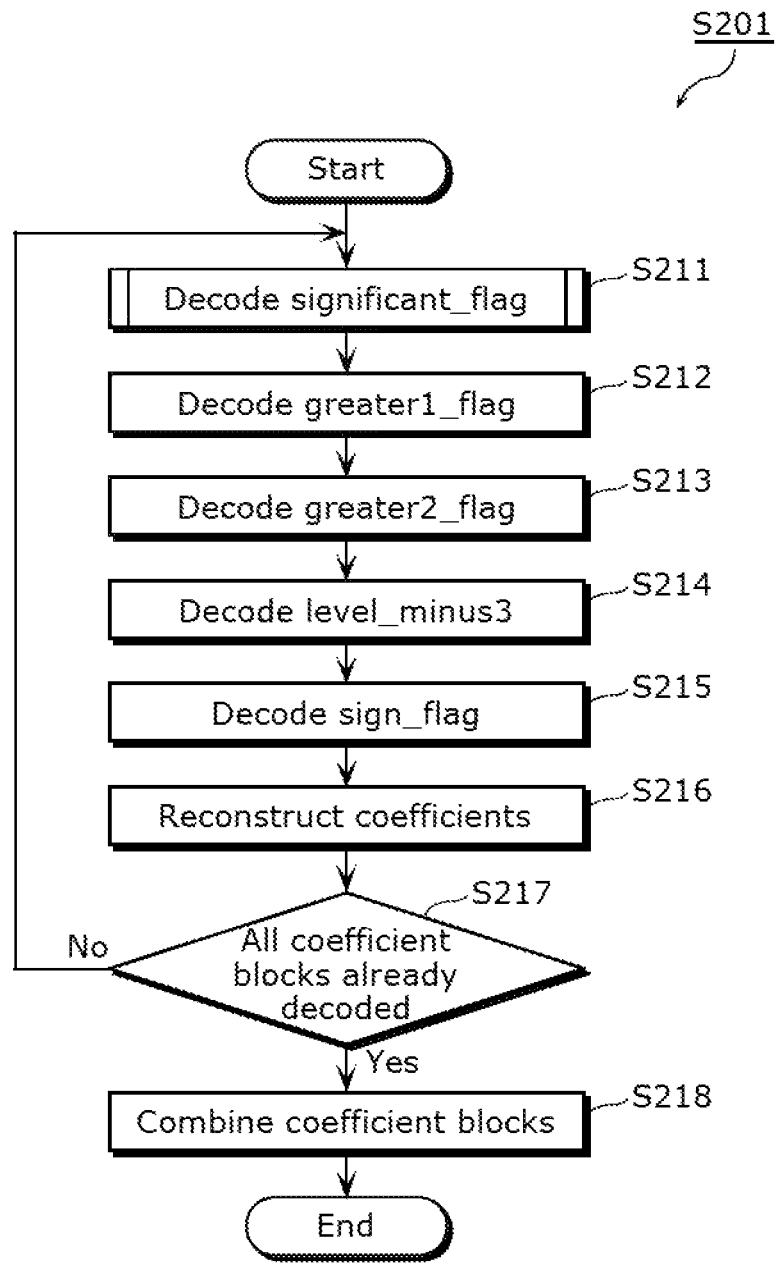
FIG. 15 is a flowchart showing a processing operation performed by the variable length decoder in Embodiment 2.

Next, a description is given of a processing operation performed by the variable length decoder 201 configured as described above. FIG. 15 is a flowchart showing a processing operation performed by the variable length decoder 201 in Embodiment 2. It is to be noted that Steps S211 to S216 are performed for each of coefficient blocks included in a decoding-target block.

(Step S211)

The significant_flag decoder 211 performs, using a corresponding context, arithmetic decoding on the significant_flag of each coefficient included in the coefficient block. Next, the significant_flag decoder 211 outputs the significant_flag to the greater1_flag decoder 212, the greater2_flag decoder 213, the level_minus3 decoder 214, the sign_flag decoder 215, and the coefficient reconstructing unit 216.

(Step S212)

The greater1_flag decoder 212 performs, using a corresponding context, arithmetic decoding on the greater1_flag of the coefficient having a significant_flag of "1". Next, the greater1_flag decoder 212 outputs the greater1_flag to the greater2_flag decoder 213, the level1_minus3 decoder 214, and the coefficient reconstructing unit 216.

(Step S213)

The greater2_flag decoder 213 performs, using a corresponding context, arithmetic decoding on the greater2_flag of the coefficient having a significant_flag of "1" and a greater1_flag of "1". Next, the greater2_flag decoder 213 outputs the greater2_flag to the level_minus3 decoder 214, and the coefficient reconstructing unit 216.

(Step S214)

The level_minus3 decoder 214 decodes the level_minus3 of the coefficient having a significant_flag of "1", a greater1_flag of "1", and a greater2_flag of "1", using a fixed symbol occurrence probability (50%) without using any context. Next, the level_minus3 decoder 214 outputs the level1_minus3 to the coefficient reconstructing unit 216.

(Step S215)

The sign_flag decoder 215 decodes the sign_flag of the coefficient having a significant_flag of "1", using the fixed symbol occurrence probability (50%), without using any context. Next, the sign_flag decoder 215 outputs the sign_flag to the coefficient reconstructing unit 216.

(Step S216)

The coefficient reconstructing unit 216 reconstructs the coefficient using the significant_flag, the greater1_flag, the greater2_flag, the level_minus3, and the sign_flag. Each of the parameters has the meaning as described earlier, the coefficient reconstructing unit 216 reconstructs the coefficient according to the meaning.

(Step S217)

Steps S212 to S216 are repeated until all the coefficient blocks in the decoding-target block are decoded.

(Step S218)

The coefficient block combining unit 217 combines all the coefficient blocks in the decoding-target block, and outputs the decoded block.

[Structure of Significant_Flag Decoder]

Figure 16:
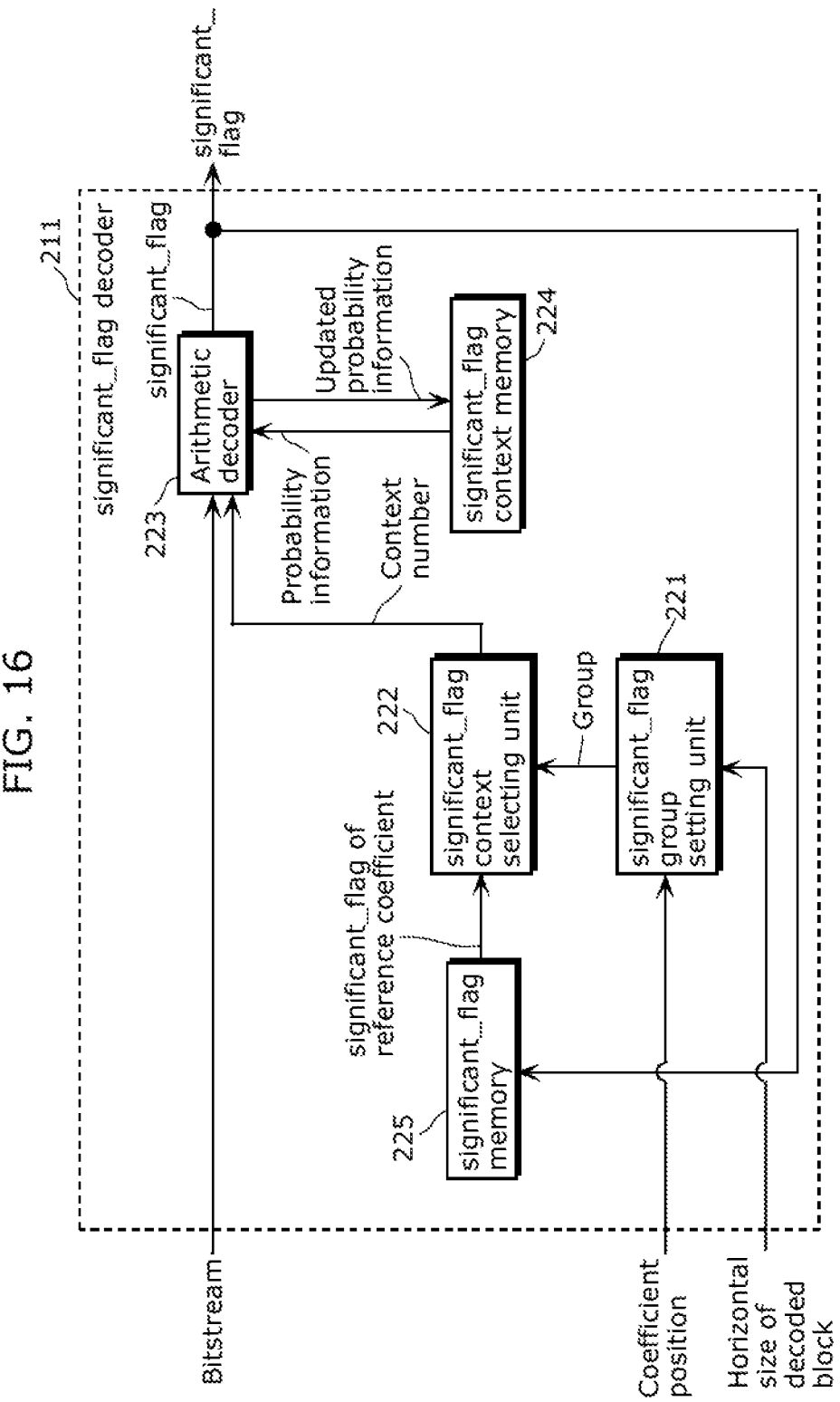
FIG. 16 is a block diagram showing an internal structure of a significant_flag decoder in Embodiment 2.

FIG. 16 shows an internal structure of a significant_flag decoder 211 in Embodiment 2. The significant_flag decoder 211 includes a significant_flag group setting unit 221, a significant_flag context selecting unit 222, an arithmetic decoder 223, a significant_flag context memory 224, and a significant_flag memory 225.

The significant_flag group setting unit 221 divides the plurality of coefficient blocks included in the coding block into groups, as performed by the significant_flag group setting unit 121 in Embodiment 1.

The significant_flag context selecting unit 222 selects, for each coefficient block, a context for arithmetic coding on parameters indicating the processing-target coefficient (decoding-target coefficient) included in the coefficient block from the context set corresponding to the coefficient block, based on at least one reference coefficient around the coding-target coefficient. More specifically, the significant_flag context selecting unit 222 selects a context from the context set corresponding to the sum of the values indicating the horizontal direction position and the vertical direction position of the coefficient block in the coding block.

The arithmetic decoder 223 obtains the probability information about the selected context from the significant_flag context memory 224. Next, the arithmetic decoder 223 performs arithmetic decoding on the parameter indicating the processing-target coefficient using the probability information about the obtained context. In this embodiment, the parameter is the significant_flag.

Furthermore, the arithmetic decoder 223 stores the decoded significant_flag in the significant_flag memory 225. In addition, the arithmetic decoder 223 updates the probability information about the context stored in the significant_flag context memory 224, according to the value of the significant_flag.

The significant_flag context memory 224 stores the probability information about each context.

The significant_flag memory 225 stores the significant_flag for each coefficient.

[Operation (Decoding of Significant_Flag)]

Figure 17:
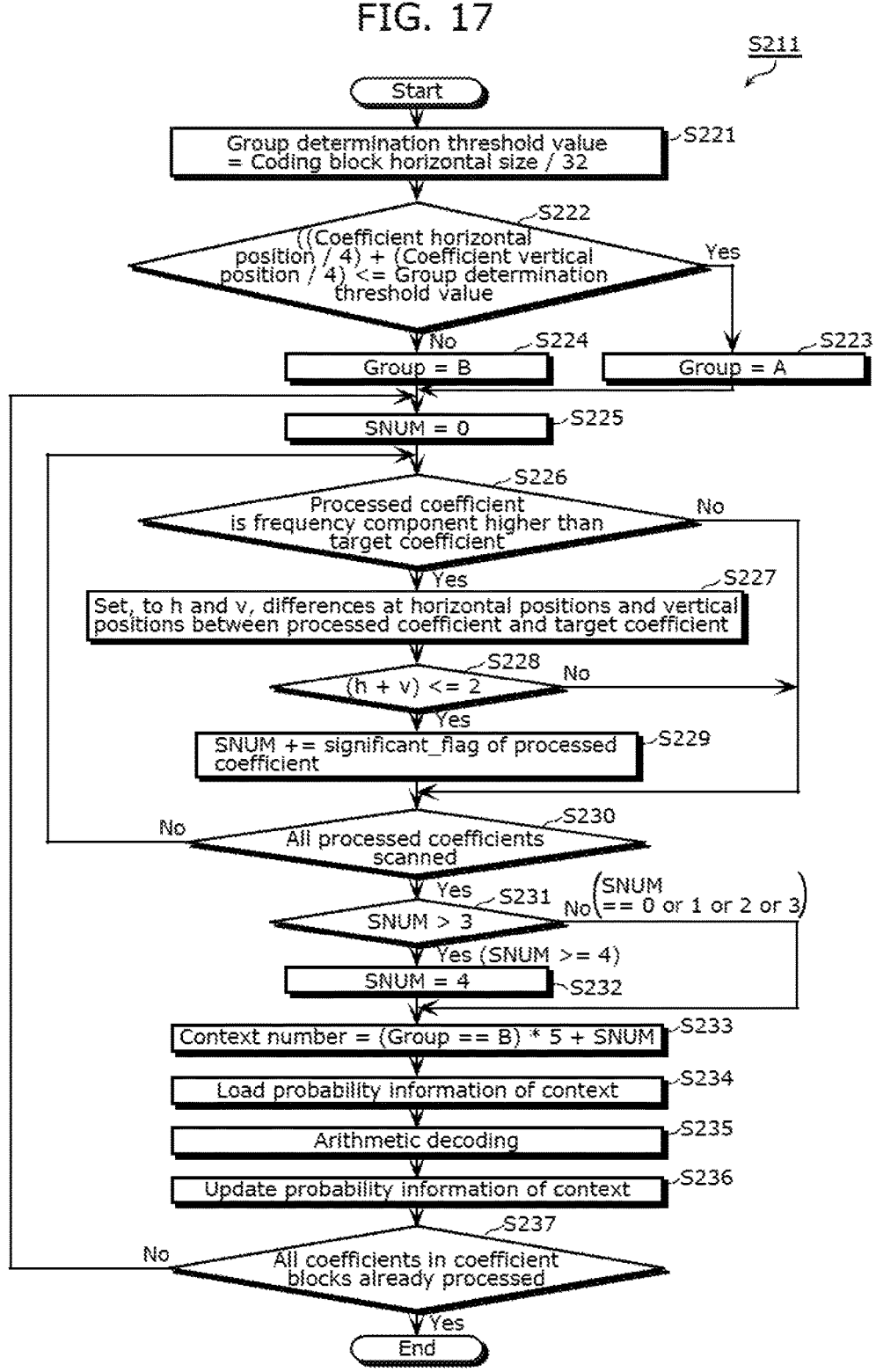
FIG. 17 is a flowchart showing a processing operation performed by the significant_flag decoder in Embodiment 2.

Next, a description is given of the significant_flag decoder 211 configured as described above. FIG. 17 is a flowchart indicating a processing operation performed by the significant_flag decoder.

(Steps S221 to S224)

The significant_flag group setting unit 221 divides the coefficient blocks into groups in the same manner as in Steps S121 to S124 in FIG. 9.

(Steps S225 to S233)

The significant_flag context selecting unit 222 selects a context based on a reference coefficient located around the processing-target coefficient from the context set corresponding to the group to which the coefficient block belongs, in the same manner as in Steps S128 to S136 in FIG. 9.

More specifically, the significant_flag context selecting unit 222 selects a context from a first context set (contexts with context numbers 0 to 4) when the sum of the horizontal and vertical direction positions of the coefficient block is smaller than or equal to the threshold value. In addition, the significant_flag context selecting unit 222 selects a context from a second context set (contexts with context numbers 5 to 9) when the sum of the horizontal and vertical direction positions of the coefficient block is smaller than or equal to the threshold value. In other words, the significant_flag context selecting unit 222 selects the context corresponding to the number of reference coefficients having a value that is not "0" from among the reference coefficients of the frequency components higher than the frequency component having the processing-target coefficient (stated inversely, the number of reference coefficients having a "0" value).

(Step S234)

The arithmetic decoder 223 loads context probability information from the significant_flag context memory 224 according to the context number.

(Step S235)

The arithmetic decoder 223 performs arithmetic decoding on the significant_flag using the probability information.

(Step S236)

The arithmetic decoder 223 updates the context probability information depending on the value of the significant_flag, and stores the updated context probability information into the significant_flag context memory 224.

(Step S237)

Steps S225 to S236 are repeated until all the coefficients in the coefficient block are processed.

Although a determination on the group to which the coefficient block belongs is made on a per coefficient block basis in FIG. 17, such a determination may be made on coefficient-by-coefficient basis. In other words, a return to Step S225 is made when the determination result in Step S237 is No, but it is possible to make a return to Step S222 instead. Even in this case, it is possible to prevent occurrence of a switch between context sets in a coefficient block.

Furthermore, in this case, it is only necessary to load the context set corresponding to the determined group from the memory, and thus it is possible to reduce the load placed onto the memory.

Advantageous Effects

Similarly in the case of the image coding apparatus 100 in Embodiment 1, according to the image decoding apparatus 200 in this embodiment, it is possible to suppress decease in the coding efficiency, and to reduce the load for context selection as described above.

Although only some exemplary embodiments have been described above, the scope of the Claims of the present application is not limited to these embodiments. Those skilled in the art will readily appreciate that various modifications may be made in these exemplary embodiments and that other embodiments may be obtained by arbitrarily combining the structural elements of the embodiments without materially departing from the novel teachings and advantages of the subject matter recited in the appended Claims. Accordingly, all such modifications and other embodiments are included in the present disclosure.

For example, in each of the embodiments, the values indicating the horizontal direction position and the vertical direction position of the sub-block are calculated using "the integer part of (a coefficient horizontal position/a coefficient block horizontal size)" and "the integer part of (a coefficient vertical position/a coefficient block vertical size)". However, the values may be calculated using another scheme. For example, the values indicating the horizontal direction position and the vertical direction position of the sub-block may be calculated using a shift operation instead of the division.

In addition, in each of the embodiments, the plurality of coefficients included in the coding-target block or the decoding-target block may be classified into two groups. However, the plurality of coefficients may be classified into three or more groups. In this case, the group determination threshold may be increased according to the number of groups.

In addition, the number and positions of the reference coefficients in each of the embodiments may be exemplary, and other reference coefficients may be used.

In addition, in each of the embodiments, each context is selected based on the sub-block and the number of reference coefficients. However, a context may be selected based on other conditions. For example, as a context for performing arithmetic coding on the upper left end coefficient (a direct component) in either a coding-target block or a decoding-target block, a context different from the context for the other coefficients may be selected.

In addition, in each of the embodiments, arithmetic coding or arithmetic decoding is performed on the coefficients of the coding-target block or the decoding-target block in order starting with the coefficient at the right bottom end (the highest frequency component) therein. However, it is also good to perform arithmetic coding or arithmetic decoding on the coefficients starting with the non-zero coefficient that appears first during the scanning of the coefficients started with the highest frequency component. In this case, the zero coefficients before the non-zero coefficient that appears first during the scanning of the coefficients started with the highest frequency component do not necessarily need to be subjected to arithmetic coding.

In addition, in each of the embodiments, the coefficients are coded using the five parameters. However, the coefficients may be coded using another combination of parameters. For example, the coefficients may be coded using the following three parameters: significant_flag, level_minus1, and sign_flag.

In addition, in each of the embodiments, the methods of selecting a context for performing arithmetic coding and arithmetic decoding of significant_flag are described. As for the other parameters, it is good to select a context using selection methods similar to the methods used for the significant_flag.

In addition, in each of the embodiments, the coefficients located outside the coding-target block or the decoding-target block do not always need to be used as the reference coefficient. Furthermore, it is possible to use, as reference coefficients, the coefficients included in a picture temporally different from the picture including the coding-target block or the decoding-target block.

In addition, the size of the coding block (the coding-target block or the decoding-target block) in each of the embodiments and the size of the coefficient block (sub-block) are exemplary, and thus other sizes are possible.

It is to be noted that the image coding apparatus 100 in Embodiment 1 does not need to include all the structural elements shown in FIG. 4. For example, the image coding apparatus may be configured as described below.

Figure 18:
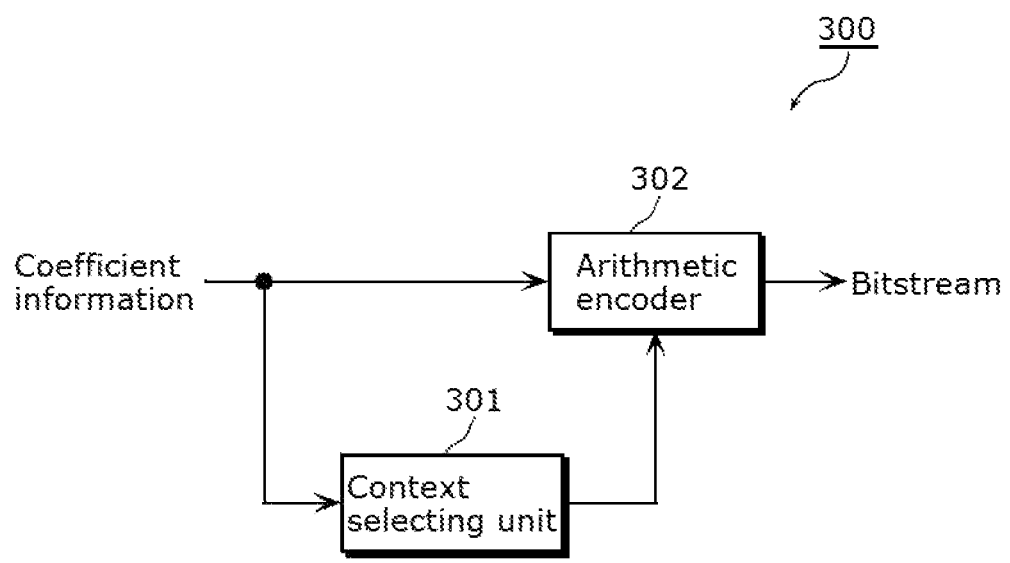
FIG. 18 is a block diagram showing a structure of an image coding apparatus in Variation of Embodiment 1.

FIG. 18 shows a structure of an image coding apparatus 300 in Variation of Embodiment 1. The image coding apparatus 300 encodes an image on a block-by-block basis. As shown in FIG. 18, the image coding apparatus 300 includes a context selecting unit 301 and an arithmetic encoder 302.

Figure 19:
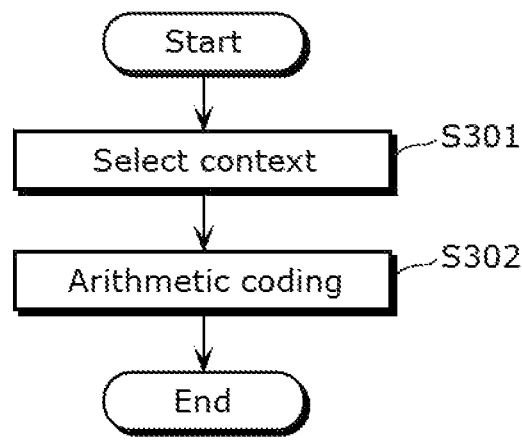
FIG. 19 is a flowchart showing a processing operation performed by the image coding apparatus in Variation of Embodiment 1.

Here, a description is given of a processing operation performed by the image coding apparatus 300 configured as described above. FIG. 19 is a flowchart showing a processing operation performed by the image coding apparatus 300 in Variation of Embodiment 1.

(Step S301)

The context selecting unit 301 selects a context for performing arithmetic coding on the parameters indicating the coefficients included in the coding-target block which is a transform unit. More specifically, the context selecting unit 301 selects, for each of the plurality of sub-blocks included in the coding-target block, a context for performing arithmetic coding on the parameters indicating the coding-target coefficients included in the sub-block from the context set corresponding to the sub-block, based on at least one reference coefficient located around the coding-target coefficient.

More specifically, the context selecting unit 301 selects, for each of the plurality of sub-blocks, a context for performing arithmetic coding on the parameters indicating the coding-target coefficients included in the sub-block, from the context set corresponding to the sum of the values indicating the horizontal direction position and the vertical direction position of the sub-block in the coding-target block.

The sub-block is a block that is obtained by dividing the coding-target block. Each of the sub-blocks includes a plurality of pixels (for example, 4×4 pixels) each including a coefficient.

Coefficients located around the coding-target coefficient means the coefficients of the pixels located within a predetermined range with respect to the pixel having the coding-target coefficient. For example, the coefficients located around the coding-target coefficient are the coefficients of frequency components higher than the frequency component having the coding-target coefficient.

The parameter indicating the coding-target coefficient is, for example, a flag (significant_flag) indicating whether or not the coding-target coefficient is 0. It is to be noted that the parameter indicating the coding-target coefficient does not need to be significant_flag, and may be another parameter.

(Step S302)

The arithmetic encoder 302 performs arithmetic coding on the parameter indicating the coding-target coefficient using probability information about the context selected by the context selecting unit 301.

As described above, the image coding apparatus 300 configured as shown in FIG. 18 can also select a context from the context set corresponding to the sum of the values indicating the horizontal direction position and the vertical direction position of the sub-block in the coding-target block. Accordingly, the image coding apparatus 300 can suppress decrease in the coding efficiency and reduce the load for context selection.

It is to be noted that the image decoding apparatus 200 in Embodiment 2 does not need to include all the structural elements shown in FIG. 12. For example, the image decoding apparatus may be configured as described below.

Figure 20:
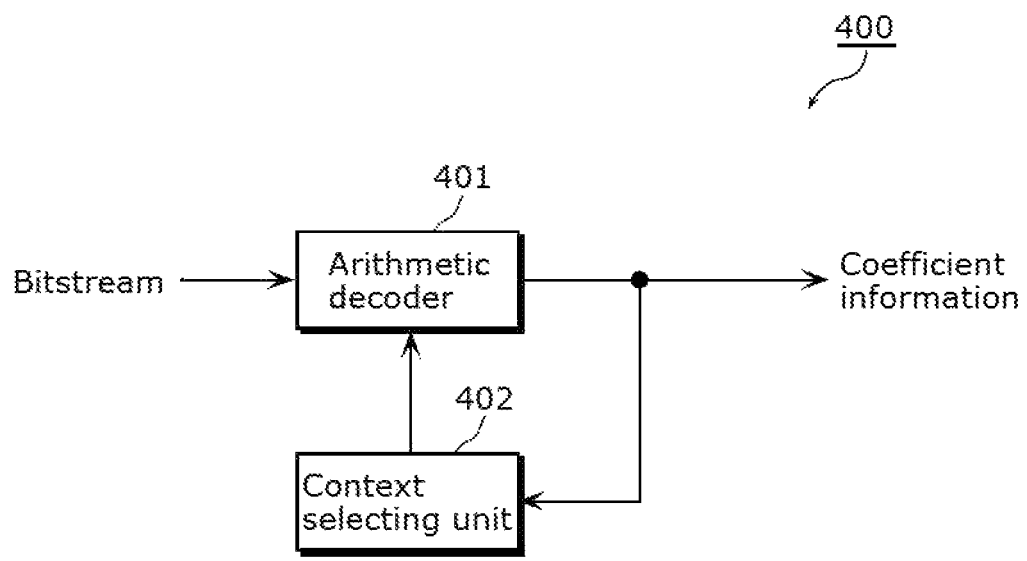
FIG. 20 is a block diagram showing a structure of an image decoding apparatus in Variation of Embodiment 2.

FIG. 20 shows a structure of the image decoding apparatus 400 in Variation of Embodiment 2. The image decoding apparatus 400 decodes an image coded on a block-by-block basis.

As shown in FIG. 20, the image decoding apparatus 400 includes a context selecting unit 401 and an arithmetic decoder 402.

Figure 21:
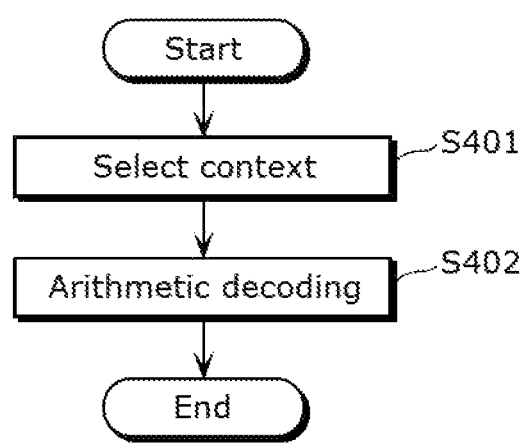
FIG. 21 is a flowchart showing a processing operation performed by the image decoding apparatus in Variation of Embodiment 2.

Here, a description is given of a processing operation performed by the image decoding apparatus 400 configured as described above. FIG. 21 is a flowchart showing a processing operation performed by the image decoding apparatus 400 in Variation of Embodiment 2.

(Step S401)

The context selecting unit 401 selects a context for performing arithmetic decoding on the parameters indicating the coefficients included in the decoding-target block which is a transform unit. The details of this processing are the same as in Step S301 in FIG. 19, and thus the same description is not repeated here.

(Step S402)

The arithmetic decoder 402 performs arithmetic decoding on the parameter indicating the decoding-target coefficient using probability information about the context selected by the context selecting unit 401.

As described above, the image decoding apparatus 400 configured as shown in FIG. 20 can select a context from the context set corresponding to the sum of the values indicating the horizontal direction position and the vertical direction position of the sub-block in the decoding-target block. Accordingly, the image decoding apparatus 400 can suppress decrease in the decoding efficiency and reduce the load for context selection.

It is to be noted that in each of the embodiments and the variation thereof, each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing any one of the image coding apparatus and the image decoding apparatus according to each of the embodiments and variations thereof etc. is a program described below.

The program is, for example, a program causing a computer to execute an image coding method for coding an image on a block-by-block basis and including: selecting, for each of a plurality of sub-blocks included in a coding-target block and each including a plurality of coefficients, a context for performing arithmetic coding on a parameter indicating a coding-target coefficient included in the sub-block from a context set corresponding to the sub-block, based on at least one reference coefficient located around the coding-target coefficient, the coding-target block being a transform unit; and performing arithmetic coding on the parameter indicating the coding-target coefficient using probability information about the selected context, wherein, in the selecting, the context is selected from the context set, the context set corresponding to a sum of (i) a value indicating a position in a horizontal direction of the sub-block in the coding-target block and (ii) a value indicating a position in a vertical direction of the sub-block in the coding-target block.

Alternatively, the program is a program for causing a computer to execute an image decoding method according to an aspect of the present disclosure is an image decoding method for decoding an image coded on a block-by-block basis and including: selecting, for each of a plurality of sub-blocks included in a decoding-target block and each including a plurality of coefficients, a context for performing arithmetic decoding on a parameter indicating a decoding-target coefficient included in the sub-block from a context set corresponding to the sub-block, based on at least one reference coefficient located around the decoding-target coefficient, the decoding-target block being a transform unit; and performing arithmetic decoding on the parameter indicating the decoding-target coefficient using probability information about the selected context, wherein, in the selecting, the context is selected from the context set, the context set corresponding to a sum of (i) a value indicating a position in a horizontal direction of the sub-block in the decoding-target block and (ii) a value indicating a position in a vertical direction of the sub-block in the decoding-target block.

Embodiment 3

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 22:
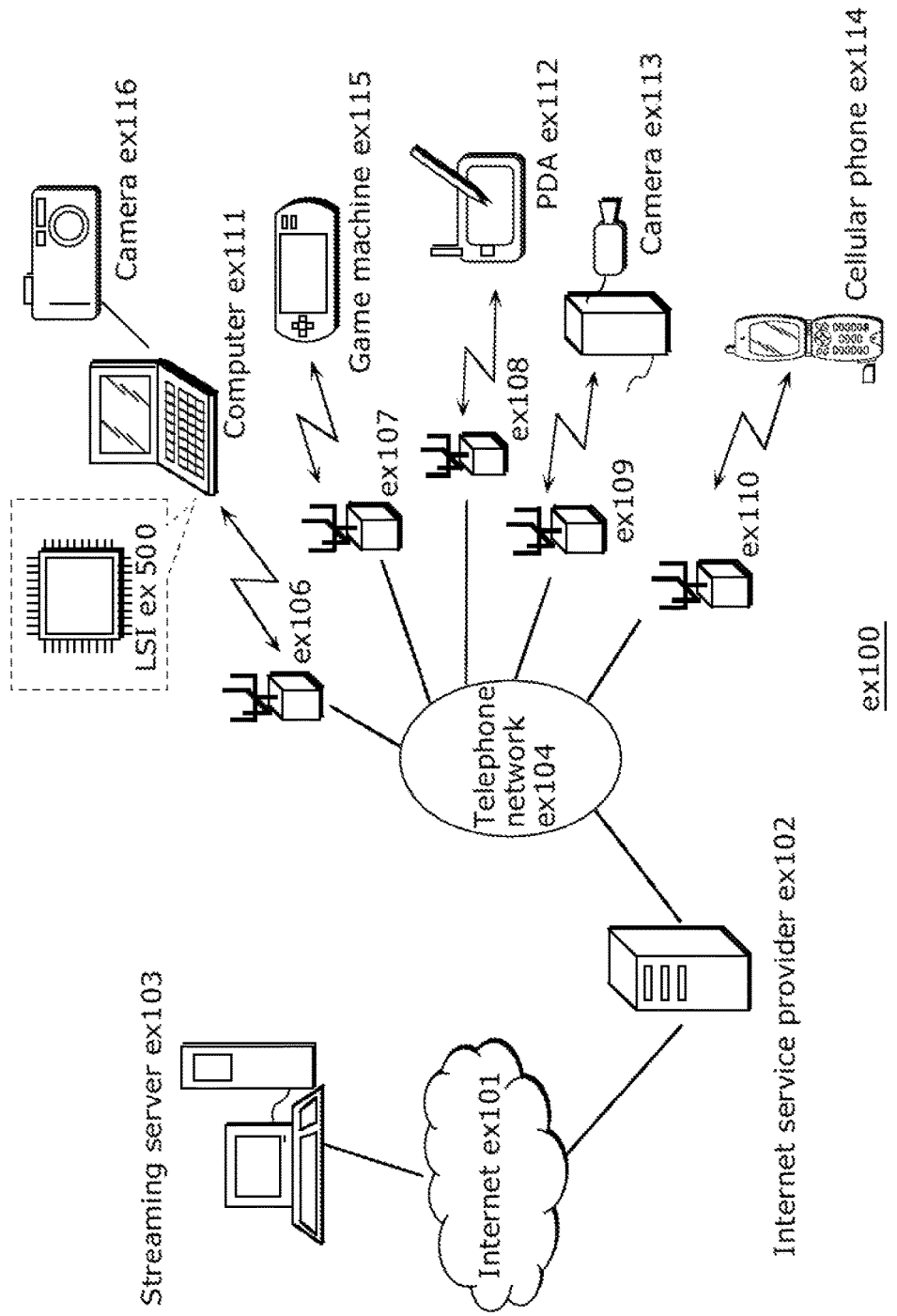
FIG. 22 shows an overall configuration of a content providing system for implementing content distribution services.

FIG. 22 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 22, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 23:
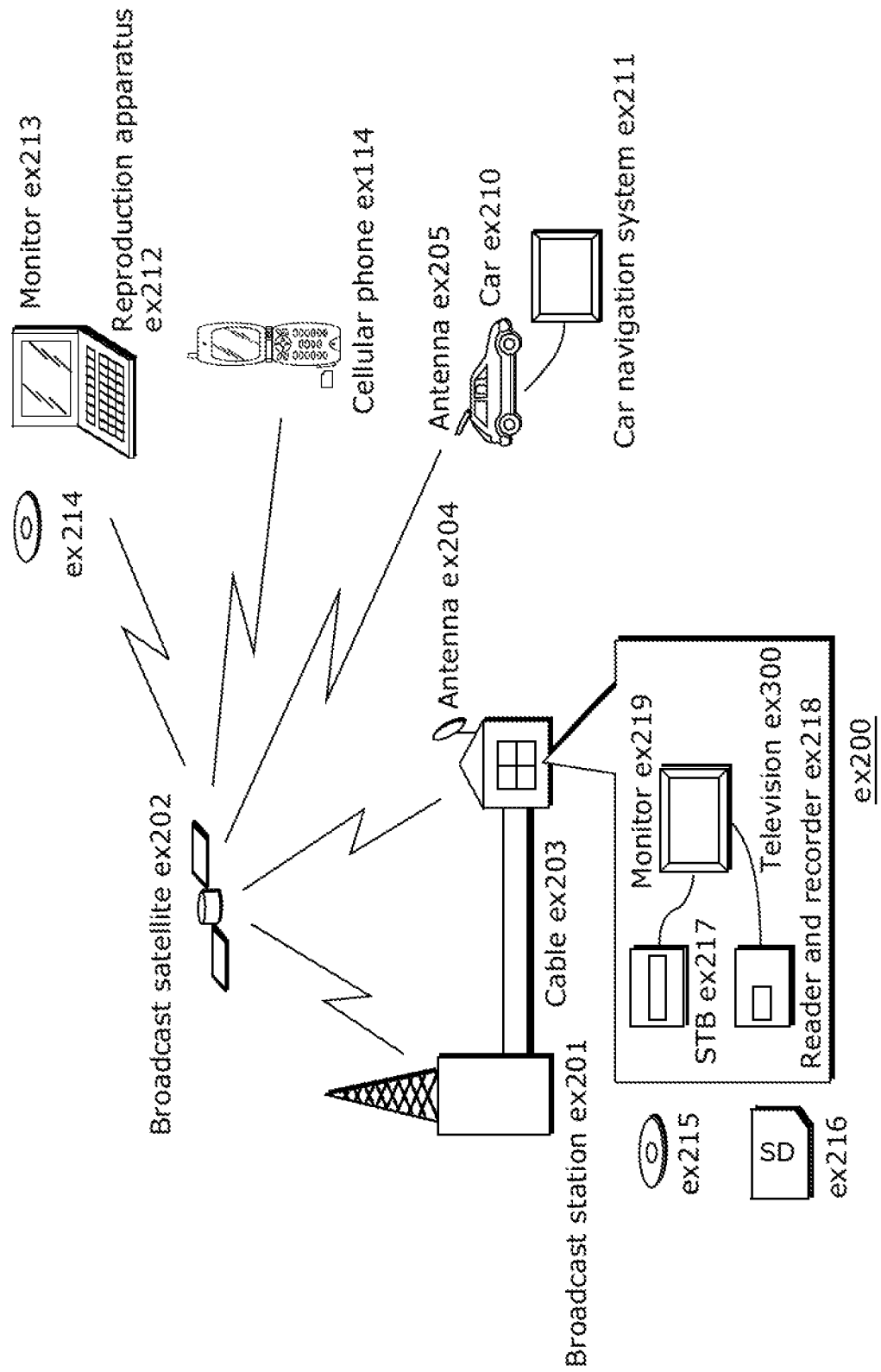
FIG. 23 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 23. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 24:
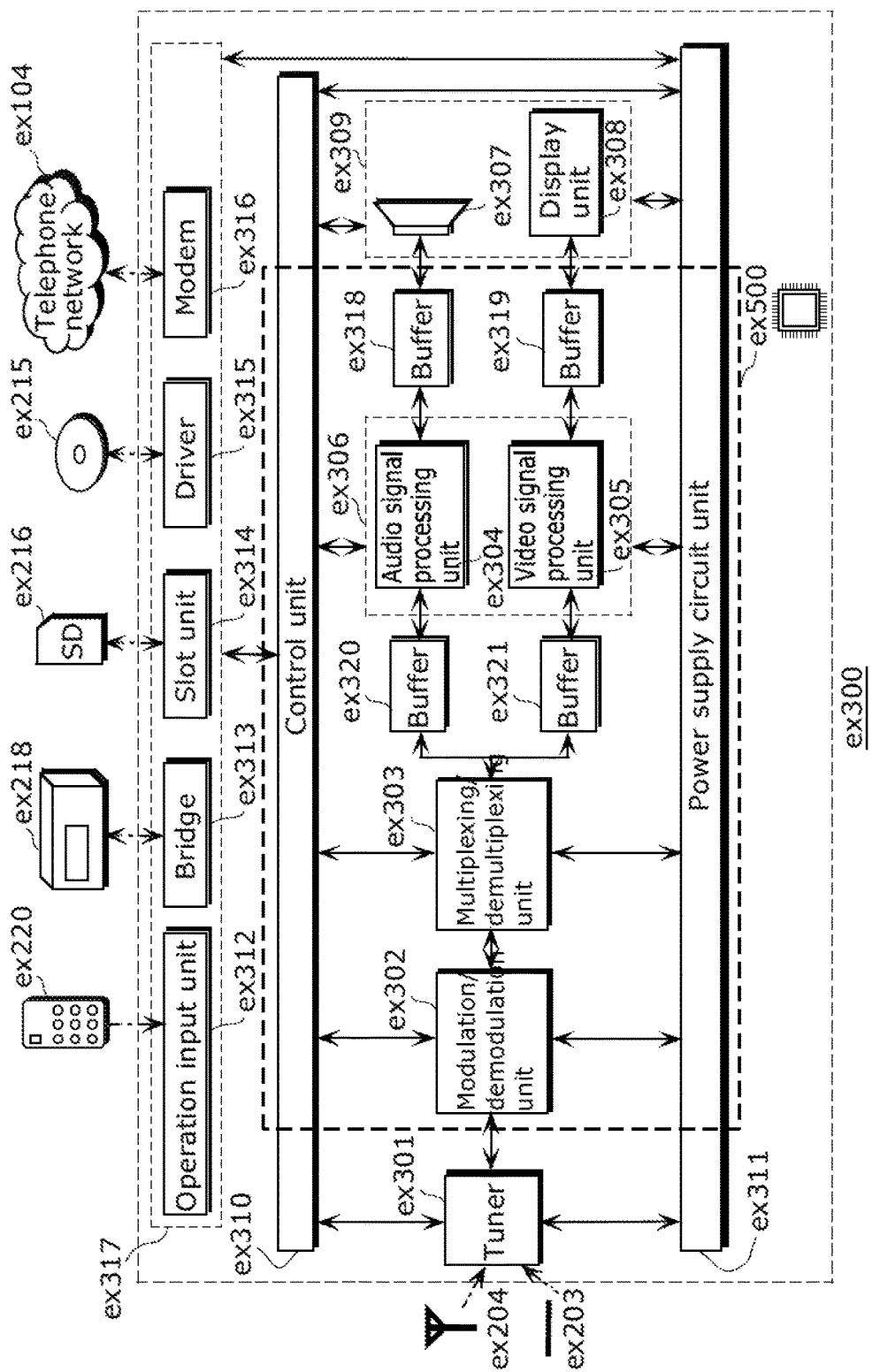
FIG. 24 shows a block diagram illustrating an example of a configuration of a television.

FIG. 24 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 25:
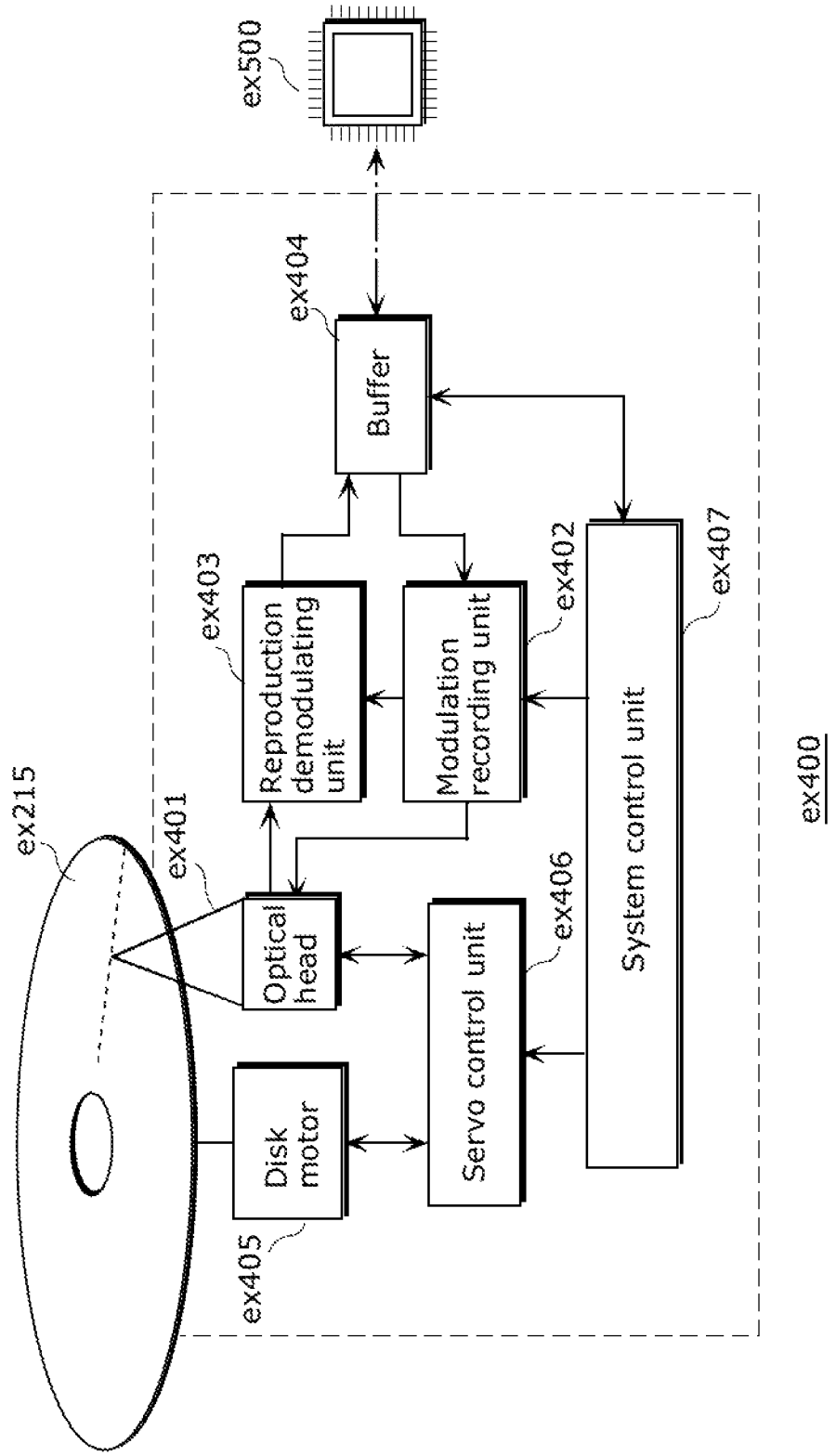
FIG. 25 shows a block diagram illustrating an example of a configuration of an information reproducing/recording unit that reads and writes information from and on a recording medium that is an optical disk.

As an example, FIG. 25 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 26:
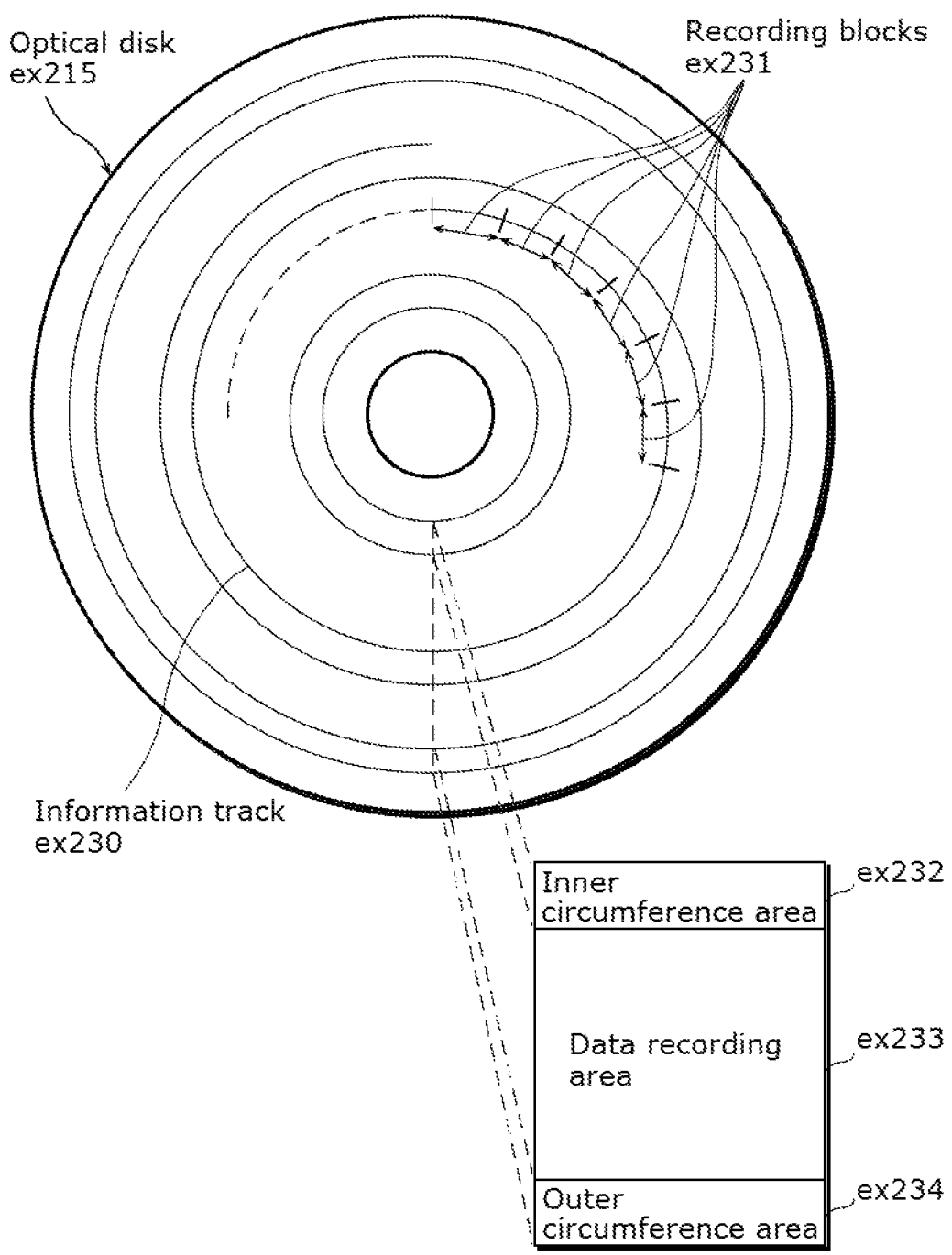
FIG. 26 shows an example of a configuration of a recording medium that is an optical disk.

FIG. 26 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 24. The same will be true for the configuration of the computer ex111, the cellular phone ex114, and others.

Figure 27A:
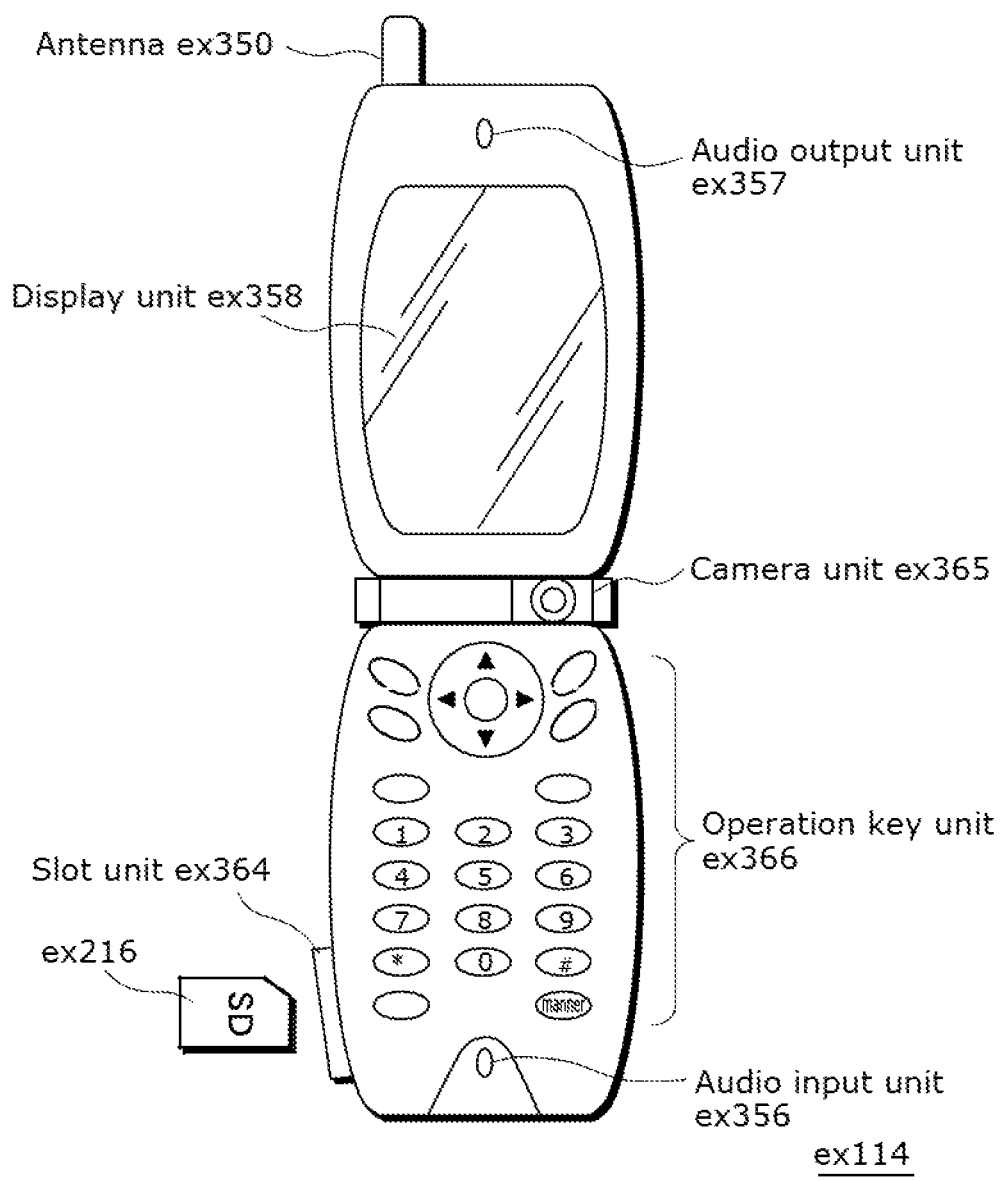
FIG. 27A shows an example of a cellular phone.

FIG. 27A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 27B:
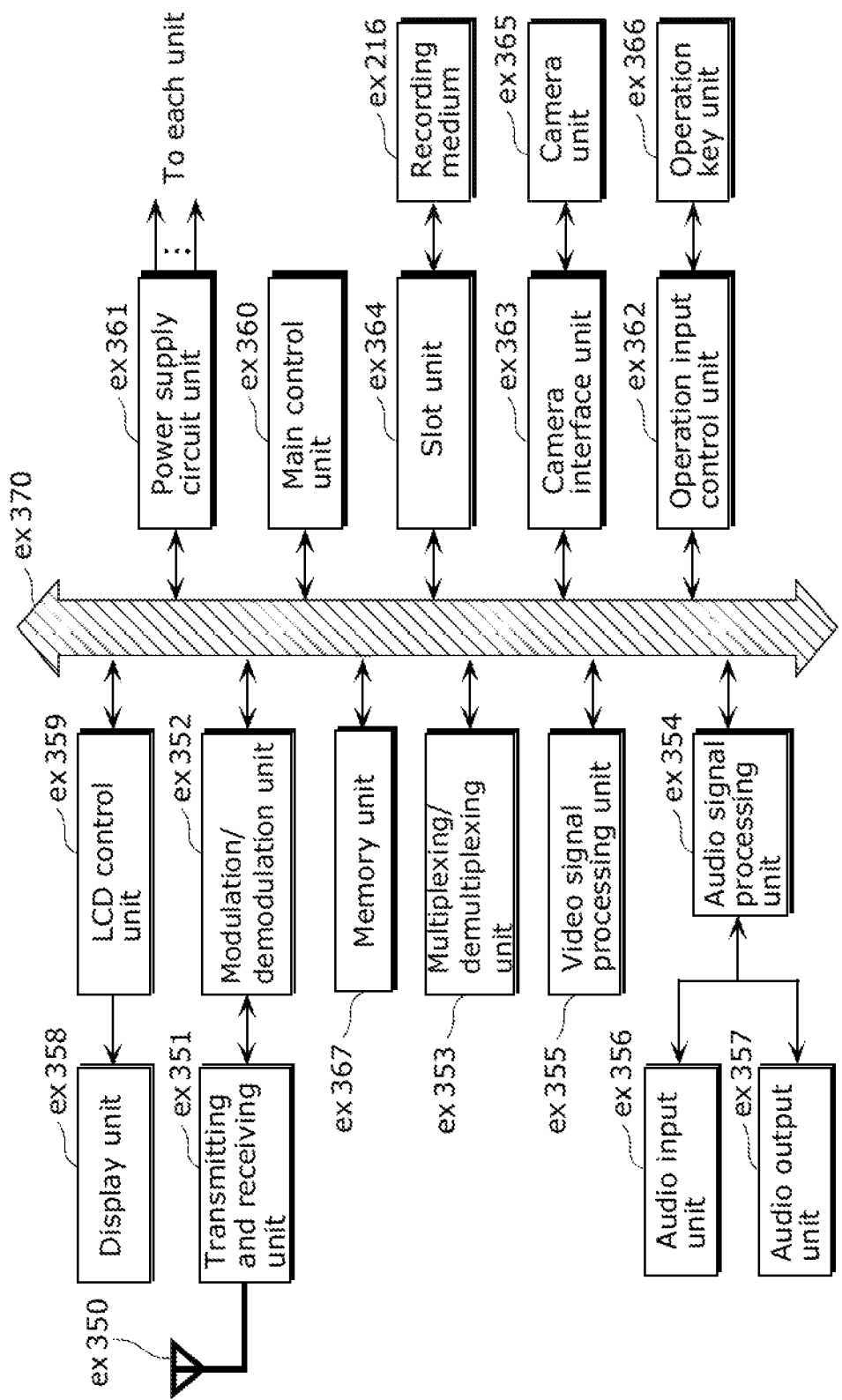
FIG. 27B is a block diagram showing an example of a configuration of a cellular phone.

Next, an example of a configuration of the cellular phone ex114 will be described with reference to FIG. 27B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-toanalog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to the above-described embodiments of the present disclosure, and various modifications and revisions can be made without deviating from the scope of the present disclosure.

Embodiment 4

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 28 illustrates a structure of the multiplexed data. As illustrated in FIG. 28, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 29:
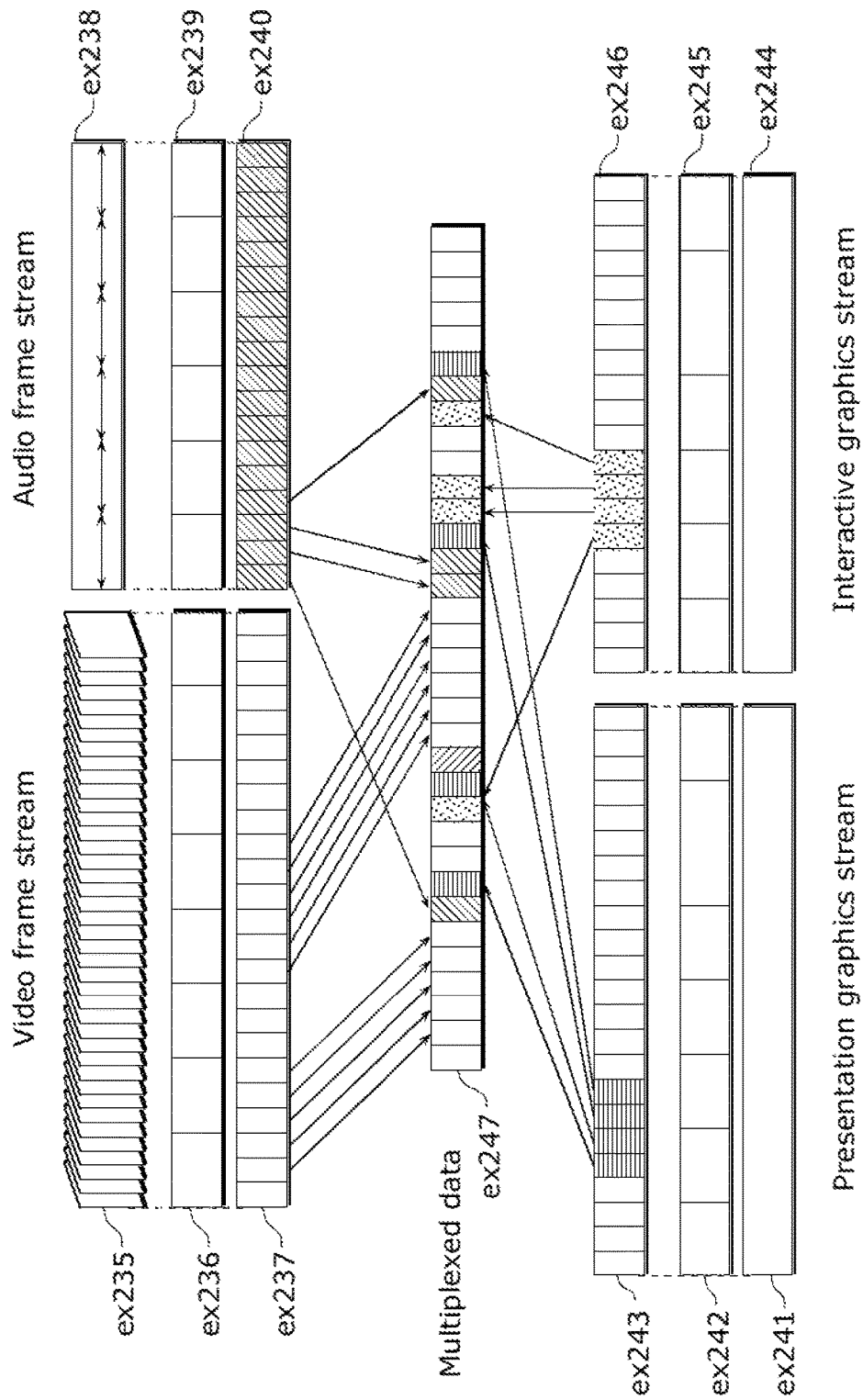
FIG. 29 schematically shows how each stream is multiplexed in multiplexed data.

FIG. 29 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 30:
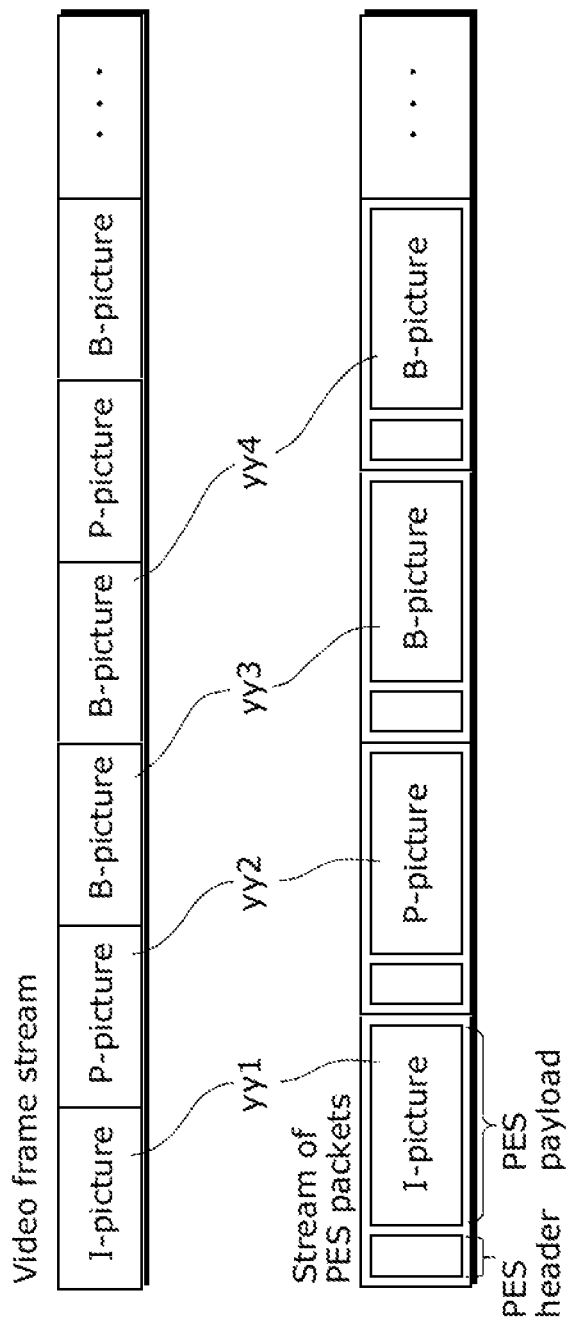
FIG. 30 shows how a video stream is stored in a stream of PES packets in more detail.

FIG. 30 illustrates how a video stream is stored in a stream of PES packets in more detail. The first bar in FIG. 30 shows a video frame stream in a video stream. The second bar shows the stream of PES packets. As indicated by arrows denoted as yy1, yy2, yy3, and yy4 in FIG. 30, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 31 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 31. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 32:
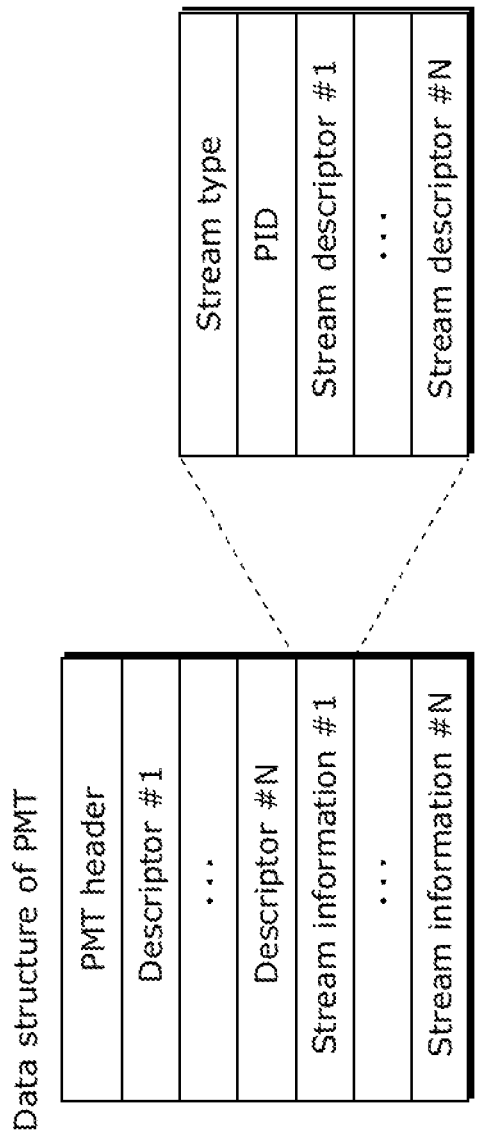
FIG. 32 shows a data structure of a PMT.

FIG. 32 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 33:
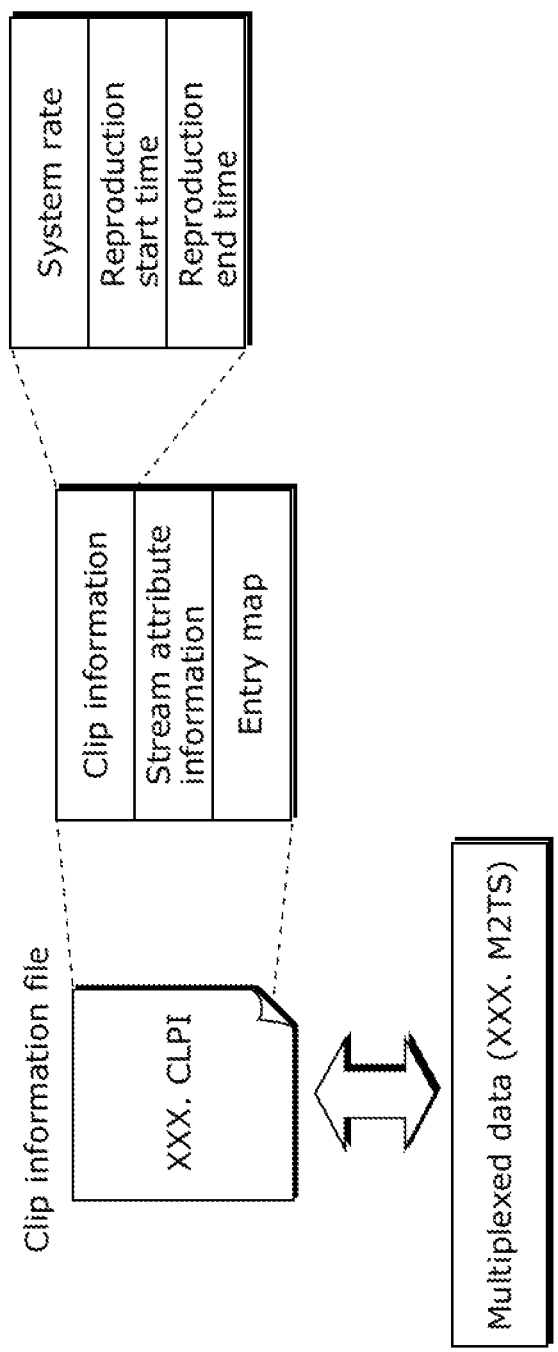
FIG. 33 illustrates an internal structure of multiplexed data.

Each of the multiplexed data information files is management information of the multiplexed data as shown in FIG. 33. The multiplexed data information files are in one to one correspondence with the multiplexed data, and each of the files includes multiplexed data information, stream attribute information, and an entry map.

As illustrated in FIG. 33, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 34:
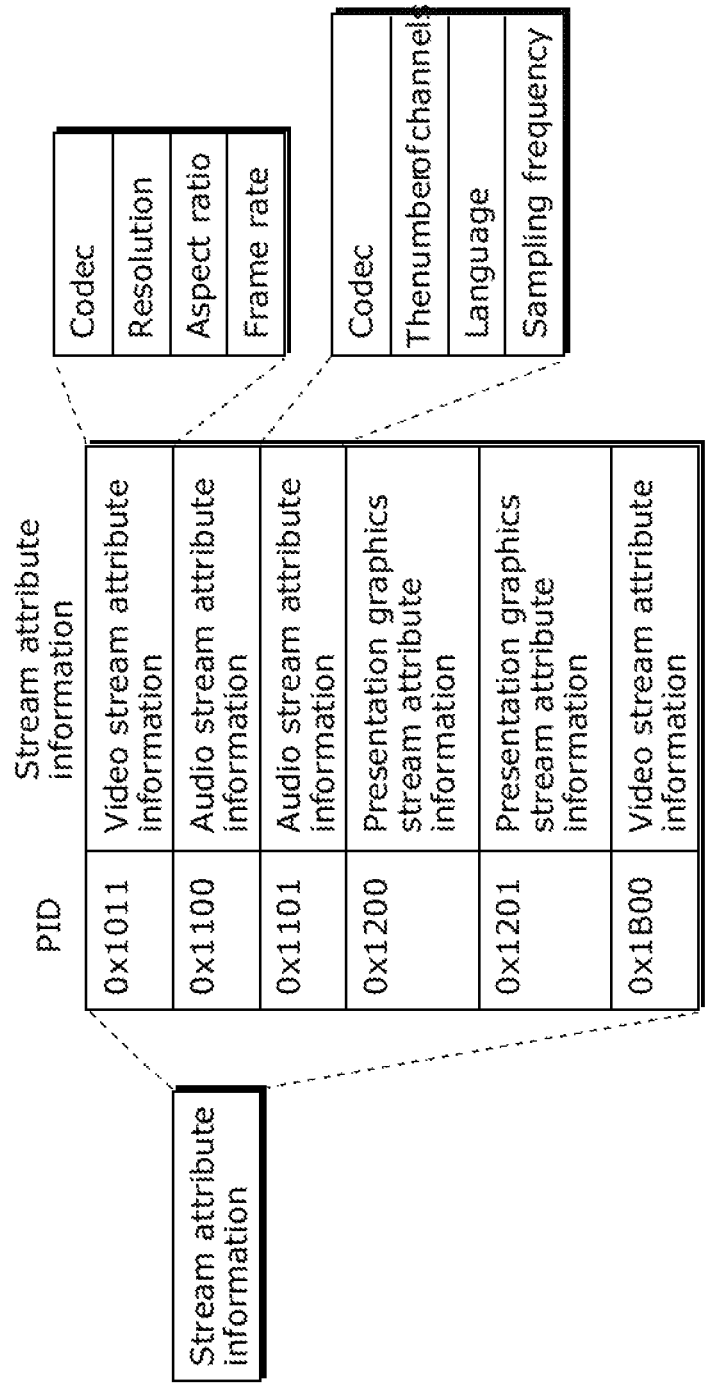
FIG. 34 shows an internal structure of stream attribute information.

As shown in FIG. 34, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 35:
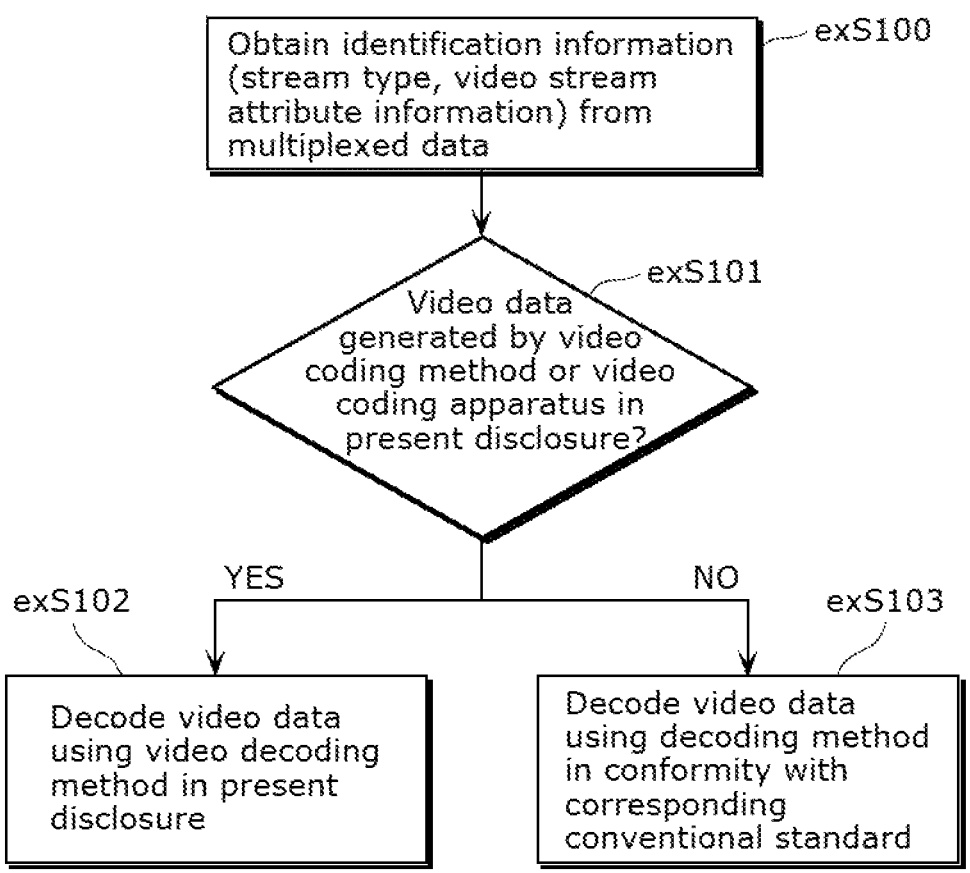
FIG. 35 shows steps for identifying video data.

Furthermore, FIG. 35 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 5

Figure 36:
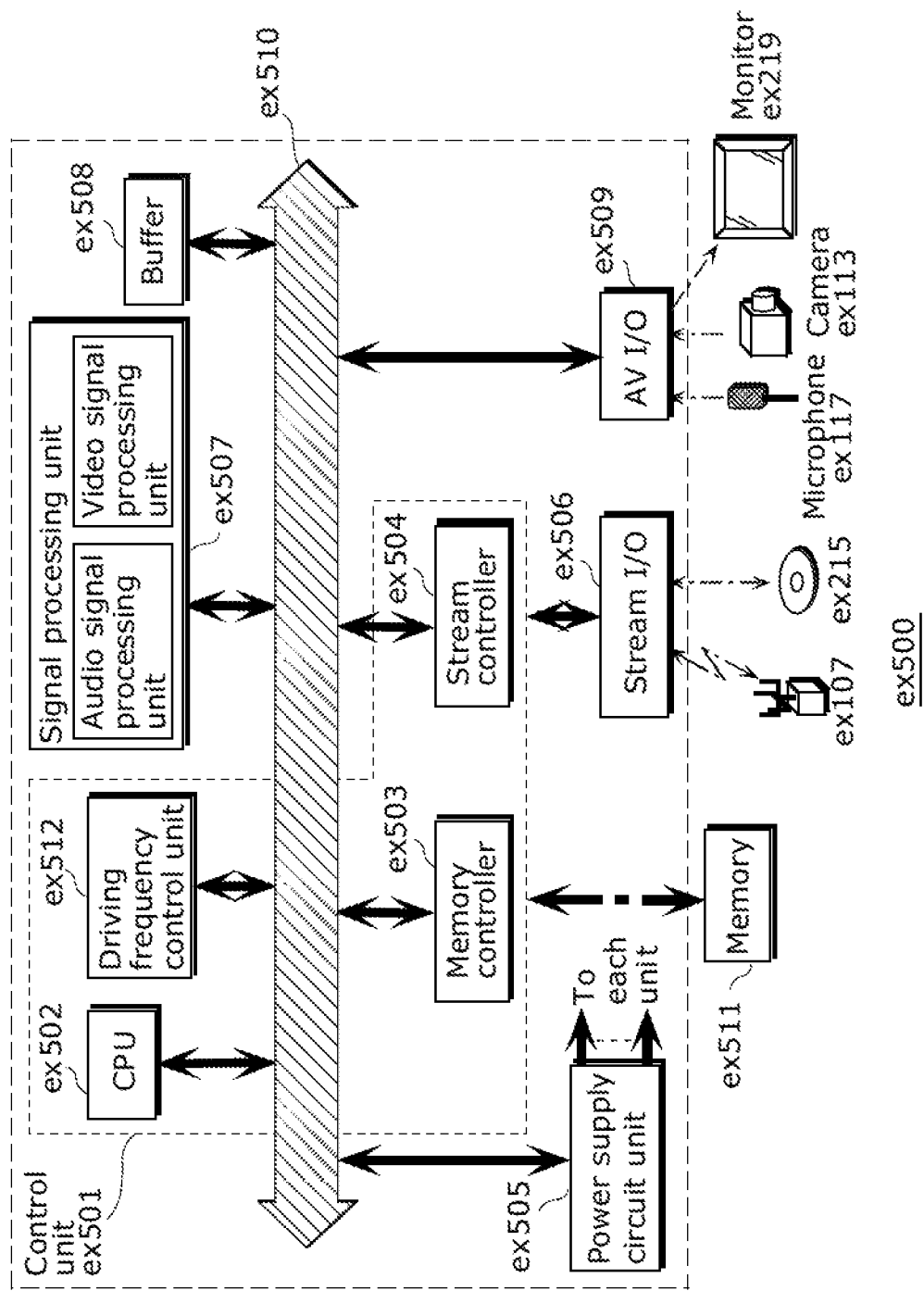
FIG. 36 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 36 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 6

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 37:
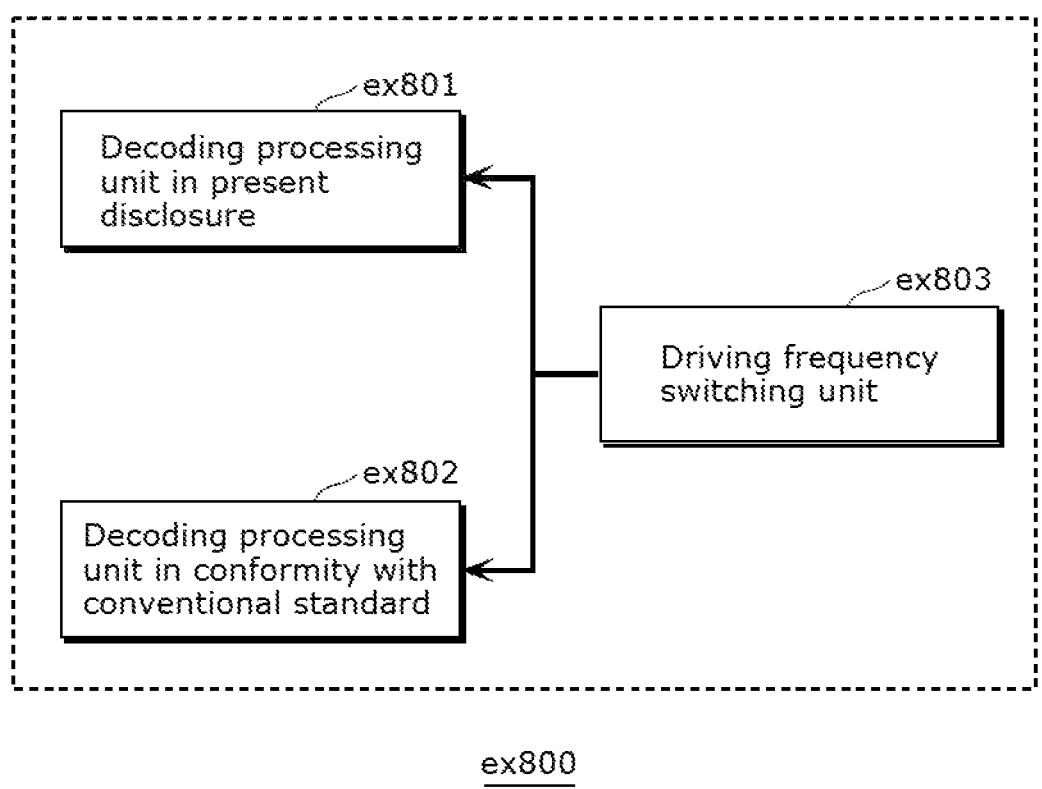
FIG. 37 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 37 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 36. Here, each of the decoding processing unit ex801 that executes the moving picture decoding method described in each of embodiments and the decoding processing unit ex802 that conforms to the conventional standard corresponds to the signal processing unit ex507 in FIG. 36. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 39. The driving frequency can be selected by storing the look-up table in the buffer ex508 and in an internal memory of an LSI, and with reference to the look-up table by the CPU ex502.

Figure 38:
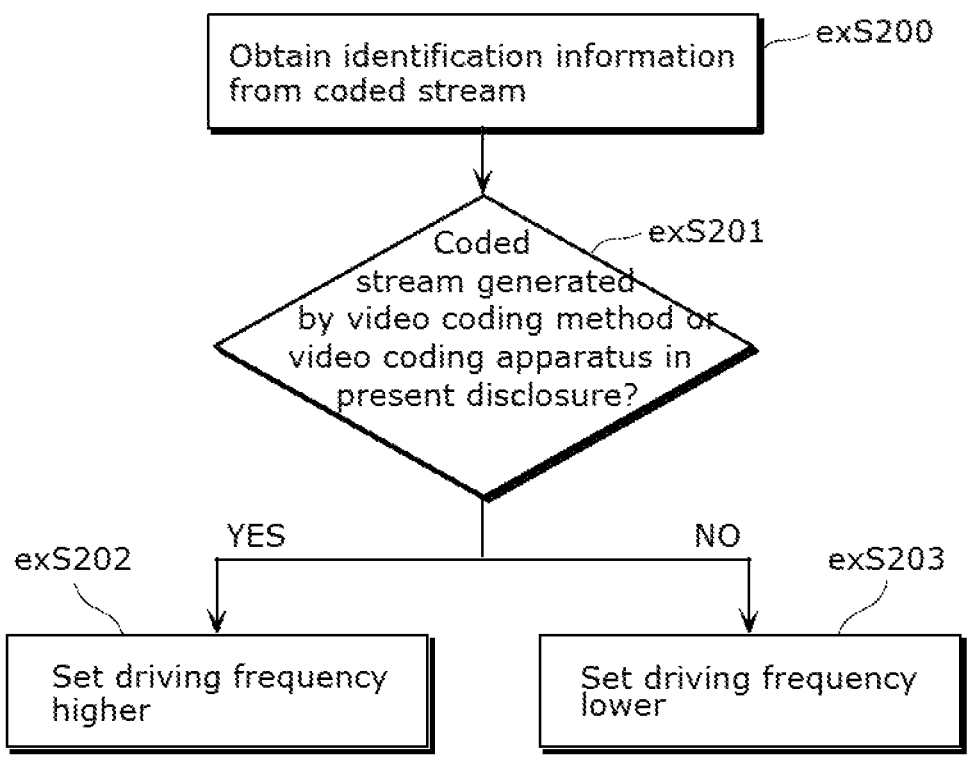
FIG. 38 shows steps for identifying video data and switching between driving frequencies.

FIG. 38 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 40A:
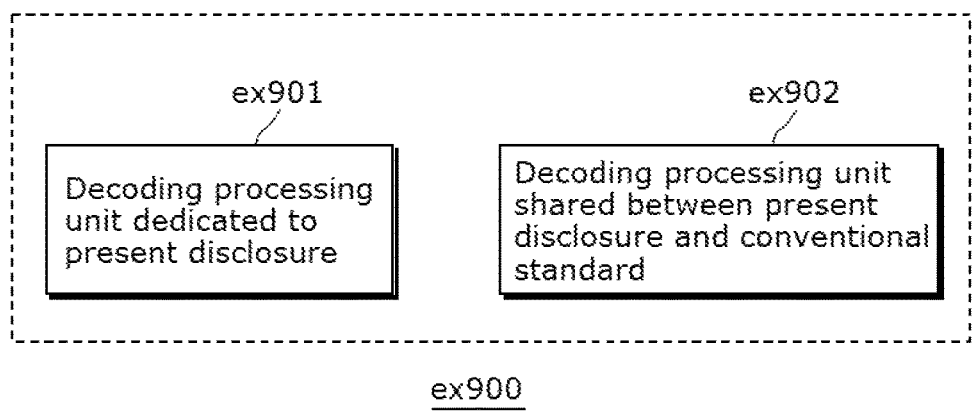
FIG. 40A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 40A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present disclosure. Since the aspect of the present disclosure is characterized by entropy decoding in particular, for example, the dedicated decoding processing unit ex901 is used for entropy decoding. Otherwise, the decoding processing unit is probably shared for one of the inverse quantization, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 40B:
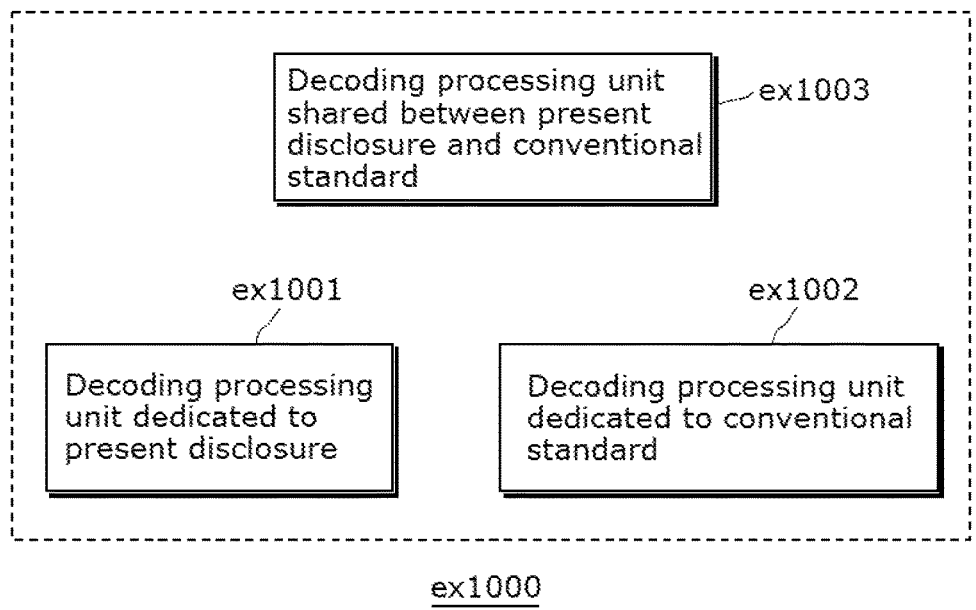
FIG. 40B is a diagram showing another example of a configuration for sharing a module of the signal processing unit.

Furthermore, ex1000 in FIG. 40B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

The invention claimed is:

1. An image coding method for coding an image on a block-by-block basis, the image coding method comprising:
    selecting, for each of a plurality of sub-blocks included in a coding-target block and each including a plurality of coefficients, a context for performing arithmetic coding on a parameter indicating a coding-target coefficient included in the sub-block from a context set corresponding to the sub-block, based on at least one reference coefficient located around the coding-target coefficient, the coding-target block being a transform unit; and
    performing arithmetic coding on the parameter indicating the coding-target coefficient using probability information about the selected context,
    wherein, in the selecting, the context is selected from the context set, the context set corresponding to a sum of (i) a horizontal value indicating a position in a horizontal direction of the sub-block in the coding-target block and (ii) a vertical value indicating a position in a vertical direction of the sub-block in the coding-target block,
    the horizontal value is an integer part of (a horizontal position of the coding-target coefficient/4), where the horizontal position of the coding target coefficient is a horizontal direction distance from a position of an upper left coefficient in the coding-target block, and
    the vertical value is an integer part of (a vertical position of the coding-target coefficient/4), where the vertical position of the coding target coefficient is a vertical direction distance from the position of the upper left coefficient in the coding-target block.

2. The image coding method according to claim 1, wherein, in the selecting,
    when the sum is smaller than or equal to a threshold value, the context is selected from a first context set; and
    when the sum is larger than the threshold value, the context is selected from a second context set different from the first context set.

3. The image coding method according to claim 2, wherein, in the selecting, the threshold value increases with an increase in the size of the coding-target block.

4. The image coding method according to claim 1, wherein the at least one reference coefficient is a coefficient of a frequency component higher than a frequency component having the coding-target coefficient.

5. The image coding method according to claim 1, wherein the parameter indicating the coding-target coefficient is a flag indicating whether the coding-target coefficient is 0 or not.

6. The image coding method according to claim 1, wherein the at least one reference coefficient is a plurality of reference coefficients, and
    the context selected in the selecting corresponds to a total number of reference coefficients having a non-zero value among the plurality of reference coefficients.

7. The image coding method according to claim 1, further comprising:
    making a switch between a first coding process conforming to a first standard and a second coding process conforming to a second standard;
    adding, to a bit stream, identification information indicating one of the first standard and the second standard which supports one of the first coding process and the second coding process to which the switch is made; and
    when the switch is made to the first coding process, the selecting and the arithmetic coding are performed as the first coding process.

8. An image coding apparatus which codes an image on a block-by-block basis, the image coding apparatus comprising:
    a context selecting unit configured to select, for each of a plurality of sub-blocks included in a coding-target block and each including a plurality of coefficients, a context for performing arithmetic coding on a parameter indicating a coding-target coefficient included in the sub-block from a context set corresponding to the sub-block, based on at least one reference coefficient located around the coding-target coefficient, the coding-target block being a transform unit; and
    an arithmetic encoder configured to perform arithmetic coding on the parameter indicating the coding-target coefficient using probability information about the selected context,
    wherein, the context selecting unit is configured to select, the context from the context set, the context set corresponding to a sum of (i) a horizontal value indicating a position in a horizontal direction of the sub-block in the coding-target block and (ii) a vertical value indicating a position in a vertical direction of the sub-block in the coding-target block,
    the horizontal value is an integer part of (a horizontal position of the coding-target coefficient/4), where the horizontal position of the coding target coefficient is a horizontal direction distance from a position of an upper left coefficient in the coding-target block, and
    the vertical value is an integer part of (a vertical position of the coding-target coefficient/4), where the vertical position of the coding target coefficient is a vertical direction distance from the position of the upper left coefficient in the coding-target block.

9. An image coding apparatus which codes an image on a block-by-block basis, the image coding apparatus comprising:
    a processor; and
    a non-transitory memory having stored thereon executable instructions, which when executed, cause the processor to perform:
        selecting, for each of a plurality of sub-blocks included in a coding-target block and each including a plurality of coefficients, a context for performing arithmetic coding on a parameter indicating a coding-target coefficient included in the sub-block from a context set corresponding to the sub-block, based on at least one reference coefficient located around the coding-target coefficient, the coding-target block being a transform unit; and
        performing arithmetic coding on the parameter indicating the coding-target coefficient using probability information about the selected context,
    wherein, in the selecting, the context is selected from the context set, the context set corresponding to a sum of (i) a horizontal value indicating a position in a horizontal direction of the sub-block in the coding-target block and (ii) a vertical value indicating a position in a vertical direction of the sub-block in the coding-target block, the horizontal value is an integer part of (a horizontal position of the coding-target coefficient/4), where the horizontal position of the coding target coefficient is a horizontal direction distance from a position of an upper left coefficient in the coding-target block, and the vertical value is an integer part of (a vertical position of the coding-target coefficient/4), where the vertical position of the coding target coefficient is a vertical direction distance from the position of the upper left coefficient in the coding-target block.

* * * * *